US011488325B2

(12) United States Patent
Deng et al.

(10) Patent No.: US 11,488,325 B2
(45) Date of Patent: Nov. 1, 2022

(54) AUTO CALIBRATING A SINGLE CAMERA FROM DETECTABLE OBJECTS

(71) Applicant: Microsoft Technology Licensing, LLC, Redmond, WA (US)

(72) Inventors: Hongli Deng, Bellevue, WA (US); Ryan Savio Menezes, Bellevue, WA (US); Gabriel Blanco Saldana, Kirkland, WA (US); Zicheng Liu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 318 days.

(21) Appl. No.: 16/904,498

(22) Filed: Jun. 17, 2020

(65) Prior Publication Data

US 2021/0398318 A1 Dec. 23, 2021

(51) Int. Cl.
*G06T 7/80* (2017.01)
*G06T 7/11* (2017.01)

(52) U.S. Cl.
CPC ............ *G06T 7/80* (2017.01); *G06T 7/11* (2017.01); *G06T 2207/10016* (2013.01); *G06T 2207/20081* (2013.01); *G06T 2207/30196* (2013.01); *G06T 2207/30232* (2013.01); *G06T 2207/30248* (2013.01)

(58) Field of Classification Search
CPC ... G06T 7/80; G06T 7/11; G06T 2207/10016; G06T 2207/20081; G06T 2207/30196; G06T 2207/30232; G06T 2207/30248
See application file for complete search history.

(56) References Cited

U.S. PATENT DOCUMENTS

| 9,286,678 | B2 | 3/2016 | Zhu et al. |
| 10,540,784 | B2 | 1/2020 | Surazhsky et al. |
| 10,580,164 | B2 | 3/2020 | Ramalingam et al. |
| 2015/0097937 | A1 | 4/2015 | Kord |

(Continued)

FOREIGN PATENT DOCUMENTS

| WO | 2012113732 A1 | 8/2012 |
| WO | 2018206331 A1 | 11/2018 |
| WO | 2019144289 A1 | 8/2019 |

OTHER PUBLICATIONS

"International Search Report and Written Opinion Issued in PCT Application No. PCT/US21/029265", dated Aug. 20, 2021, 11 Pages. (MS# 408622-WO-PCT).

(Continued)

*Primary Examiner* — Emily C Terrell
*Assistant Examiner* — Molly Wilburn
(74) *Attorney, Agent, or Firm* — Workman Nydegger

(57) ABSTRACT

Techniques for improved camera calibration are disclosed. An image is analyzed to identify a first set of key points for an object. A virtual object is generated. The virtual object has a second set of key points. A reprojected version of the second set is fitted to the first set in 2D space until a fitting threshold is satisfied. To do so, a 3D alignment of the second set is generated in an attempt to fit (e.g., in 2D space) the second set to the first set. Another operation includes reprojecting the second set into 2D space. In response to comparing the reprojected second set to the first set, another operation includes determining whether a fitting error between those sets satisfies the fitting threshold. A specific 3D alignment of the second set is selected. The camera is calibrated based on resulting reprojection parameters.

20 Claims, 25 Drawing Sheets

Environment
100

(56) References Cited

U.S. PATENT DOCUMENTS

2019/0096092 A1    3/2019   Zhou et al.
2019/0116354 A1    4/2019   Yao et al.

OTHER PUBLICATIONS

"Application as Filed in U.S. Appl. No. 16/516,182", dated Jul. 18, 2019, 117 Pages. (MS# 406605-US-NP).

Bhardwaj, et al., "AutoCalib: Automatic Traffic Camera Calibration at Scale", In Proceedings of 4th ACM International Conference on Systems for Energy-Efficient Built Environments, Nov. 6, 2017, 10 Pages.

Dubska, et al., "Automatic Camera Calibration for Traffic Understanding", In Proceedings of British Machine Vision Conference, vol. 4, Issue 6, Jan. 2014, pp. 1-12.

Sultana, et al., "A Review of Object Detection Models based on Convolutional Neural Network", In Repository of arXiv:1905.01614v3, May 5, 2019, 12 Pages.

Zhang, et al., "Fast Crowd Density Estimation in Surveillance Videos without Training", In Proceedings of IEEE Ninth International Conference on Advanced Video and Signal-Based Surveillance, Sep. 18, 2012, pp. 452-457.

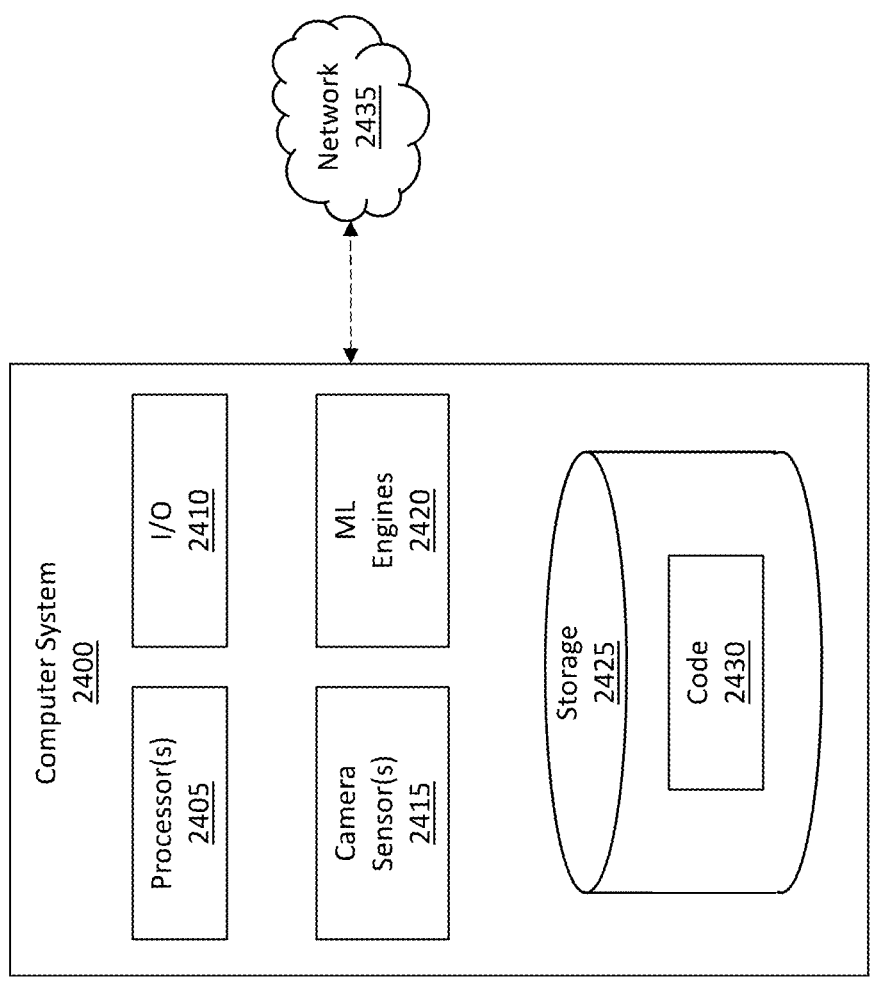

AUTO CALIBRATING A SINGLE CAMERA FROM DETECTABLE OBJECTS

BACKGROUND

Video monitoring is used in a plethora of different scenarios. For instance, video monitoring is used in traffic monitoring scenarios, in retail, in banking, and in numerous other situations. Often, these video monitoring systems rely on one or more cameras that are mounted to a fixed position and aimed in a manner to enable the camera's field of view (FOV) to cover a large area for monitoring purposes.

It is often highly beneficial to transform the events occurring in the two-dimensional (2D) image plane into the three-dimensional (3D) plane. For instance, consider a person crossing a road, or a vehicle entering an area, or a person perusing a retail store. Deducing these events in 3D space typically provides a more accurate and robust understanding of what actions are actually occurring as compared to trying to interpolate those actions in 2D space.

Numerous techniques are available to transform 2D data into 3D data. For instance, a time of flight (ToF) range finder may be used to determine depths, which can then be used to interpret the 2D images captured by a camera. Similarly, stereoscopic depth matching can also be performed when two cameras are used to cover an overlapping field of view. Unfortunately, it is often the case that monitoring systems have only a single camera, or at least only a single camera per geographic area. For instance, a specific portion of a retail store may be covered by only a single camera. As such, the above-described techniques for determining depth (and hence 3D information) are typically not available for monitoring systems. Instead of these other techniques, a calibration process can be performed to calibrate a single camera in order to transform or map the 2D image plane to 3D space.

For instance, some video monitoring and other video analytics applications require their cameras to be calibrated prior to use in order to acquire an accurate mapping between the 2D image plane and 3D space. Generally, this calibration process involves placing an object with a known pattern into the camera's FOV. The camera then captures an image of the pattern and detects distortions of the pattern in the image. The system then compares the distortions in the image to the known characteristics of the pattern. These differences enable the system to determine both extrinsic (e.g., placement, orientation, etc.) and intrinsic (e.g., focal length, camera distortion, etc.) parameters of the camera and enable the system to effectively calibrate the camera by determining the positioning relationship of the camera relative to the environment as well as determining the operational features of the camera. Once the camera system is calibrated using the known pattern, then the camera system can interpolate distances and other qualities for objects included in newly acquired 2D images.

While this calibration process sounds relatively straightforward, in practice it has been found that this calibration process is quite laborious, costly (in terms of manpower), and inefficient. Traditionally, the calibration process requires human involvement. For instance, a human was required to be present in order to place the pattern in the camera's FOV, potentially a large number of times (e.g., by placing the pattern at different locations in the camera's FOV). Similarly, many locations that utilize monitoring cameras often do not have the time or the human availability (or perhaps are reluctant due to complications) to perform this error prone calibration process. Furthermore, significant care was required in order to accurately determine the pattern's characteristics. If the baseline understanding of the characteristics were off, then the resulting calibration will be skewed.

Further frustrations occurred because the calibration process had to be repeated any time the camera's pose changed. For instance, if the camera was bumped even a slight amount, then the previous calibration was nullified and the process would have to be repeated. Similarly, if the camera system lost power, then the camera's calibrated distortion matrix may have been reset, thereby requiring another calibration.

Accordingly, there is a substantial need in the art to improve how single cameras are calibrated to transform 2D image plane data to a 3D mapping. Not only is there a substantial need to improve how the calibration process is performed but there is also a substantial need to trigger when the calibration process is performed.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices, and methods that automatically calibrate a single camera. In some implementations, the calibration is performed relative to a flat earth camera model.

In some embodiments, an image is analyzed, reviewed, examined, or segmented to identify an object of a particular type, such as a human, a vehicle, and so forth. This segment or analyzing process includes identifying a first set of key points of the object. A virtual object is generated. This virtual object is designed to be of the same particular type as the object. Furthermore, this virtual object is associated with its own set of key points (i.e. a second set). A reprojected version of the second set of key points is then fitted to the first set of key points in two-dimensional (2D) space by repeatedly performing a number of operations one or more times (e.g., perhaps until a subsequently computed fitting error satisfies a predetermined fitting threshold or fitting requirement). One operation includes generating a 3D alignment of the second set of key points. This 3D alignment is generated in an attempt to fit (e.g., in 2D space) the second set of key points with the first set of key points after the second set of key points have been reprojected into the 2D space. Another operation includes reprojecting (e.g., while the second set of key points are in the 3D alignment) the second set of key points into the 2D space. Then, in response to comparing the reprojected second set of key points to the first set of key points in 2D space, another (optional) operation includes determining whether a fitting error that is computed between the reprojected second set of key points and the first set of key points satisfies the predetermined fitting threshold. Additionally, or alternatively, the embodiments select whichever fitting error was the smallest as compared to the other computed fitting errors. The embodiments then select a specific 3D alignment of the second set of key points. As one option, the specific 3D alignment is structured to cause the corresponding fitting error of the reprojected second set of key points to satisfy the fitting threshold when the reprojected second set of key points are compared to the first set of key points in the 2D space. As another option, the alignment's corresponding fitting error is selected because it is the smallest. Furthermore, the embodiments identify reprojection parameters associated with the specific 3D alignment of the second set of key points and use those reprojection parameters to calibrate a camera that generated the image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 24 illustrates an example computer system that may be configured to perform any of the disclosed operations.

DETAILED DESCRIPTION

Figure 1:
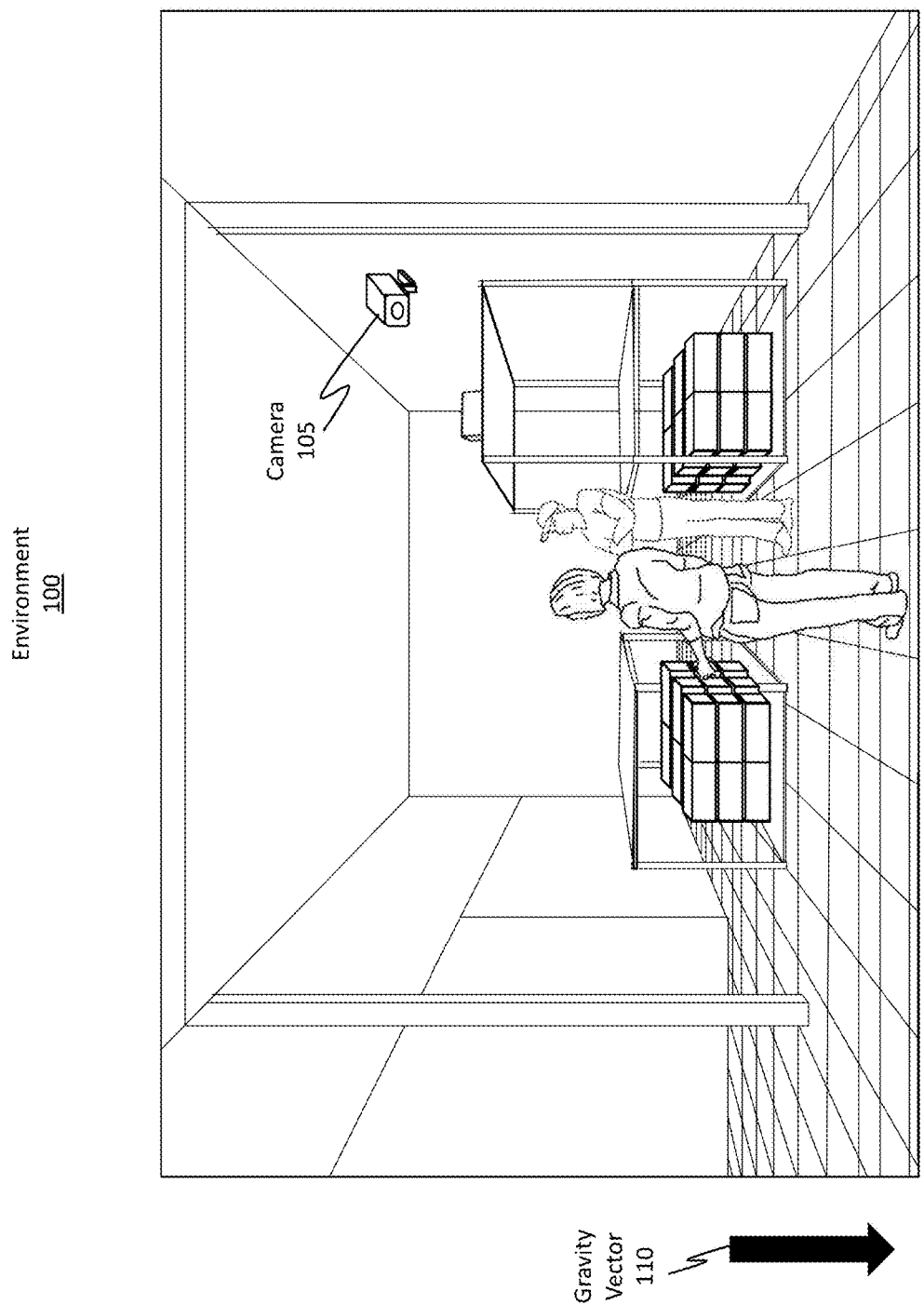
FIG. 1 illustrates an example environment in which a single camera (e.g., perhaps a monitoring camera) is mounted at a fixed position and is configured to monitor the environment.

Embodiments disclosed herein relate to systems, devices, and methods that utilize data driven techniques to automatically calibrate a single camera. In some implementations, the calibration is performed relative to a flat earth camera model. As will be described in more detail later, "calibration" refers to the process of finding the parameters that map the camera image's coordinate system to a coordinate system corresponding to the real world.

In some embodiments, an image is analyzed, examined, reviewed, or segmented to identify an object and to identify a first set of key points for that object. A virtual object, which is of the same type as the object, is generated in 3D space. The virtual object has its own set of key points (i.e. a second set). A reprojected version of the second set is fitted to the first set in 2D space by repeatedly performing operations until a computed fitting error satisfies a predetermined fitting threshold or fitting requirement. One operation includes generating a 3D alignment of the second set in an attempt to fit (e.g., in 2D space) the second set to the first set after the second set has been reprojected to 2D space. Another operation includes reprojecting (e.g., based on the generated 3D alignment) the second set into 2D space. In response to comparing the reprojected second set to the first set in 2D space, another operation includes determining whether a fitting error between those sets satisfies the fitting threshold. The embodiments then search in the camera parameter's space (e.g., given a set of computed camera parameters that were computed during the repeated operations mentioned above), and the embodiments select a specific 3D alignment of the second set, which alignment is selected as a result of that alignment causing the fitting error of the reprojected second set to satisfy the fitting threshold and/or that has the smallest fitting error. To clarify, the fitting error of this set of camera parameters is recorded and compared with the fitting errors of the other camera parameters that were computed, and the one with least error (and/or that meets the threshold) is chosen as the final camera calibration parameter. The searching in the camera parameter space (i.e. the "repeat" process recited above) may be conducted by an exhaustive search by changing the parameters incrementally or by gradient descent using a machine learning framework.

Although frequent reference is made herein to an "image," one will appreciate how the embodiments are not limited to simply a single image. For instance, a video stream may be acquired and any number of the video frames of that video stream may be used by the embodiments. Similarly, the embodiments are able to perform the disclosed operations on any number of images, including successively generated images. In this regard, the resulting operations may appear to generate their own video stream of images. Furthermore, one will appreciate how any of the disclosed operations or features may be combined with any of the other disclosed operations or features. That is, none of the disclosed material is mutually exclusive; rather, any feature is combinable with any other feature recited herein. Furthermore, the term "segment" should be interpreted broadly to mean analyze, identify, classify, or even categorize. Similarly, the term "reproject" should be interpreted broadly and refers to techniques for converting 3D point data into 2D data. Example techniques include rasterization (i.e. the process of determining 2D pixel coordinates for 3D objects), ray-tracing, perspective projection, parallel projection, orthographic projection, multiview projection, axonometric projection, diametric projection, trimetric projection, oblique projection, and so forth.

As used herein, reference to "3D space" does not necessarily mean an entire environment is generated, with an object being placed in that environment. Rather, 3D space should be interpreted broadly to refer to numerous different scenarios, including scenarios involving an expansive 3D environment as well as scenarios in which a single 3D object is generated, irrespective of any surrounding environment. Furthermore, the 3D orientation may be determined relative to a determined gravity vector. The 3D vector may be a 3 degrees of freedom (3DOF) orientation or perhaps even a 6 DOF orientation.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The embodiments provide substantial improvements, benefits, and practical applications to the technical field. For instance, substantial improvements in efficiency are achieved both in terms of manpower and computing power. By way of example, the embodiments are designed to allow for the touch-free calibration of a camera. Now, human involvement can be entirely avoided because the embodiments can perform the calibration automatically. Efficiencies are also achieved in terms of the computer system itself because the embodiments are able to detect when a calibration or re-calibration should be performed. For instance, the embodiments are able to detect when the camera has shifted pose. Based on this new pose, the embodiments can trigger a new calibration event. By staying calibrated, the camera system will provide a more accurate and robust 3D mapping of the 2D image plane, thereby improving the quality of the monitoring operations.

The disclosed principles may be practically applied in numerous different scenarios. For instance, the principles may be practiced in any type of retail environment, banking environment, or any type of environment in which video monitoring is desired. In some cases, the principles may be practiced to promote social distancing, such as during a time of a pandemic. In fact, through the use of a calibrated camera, the embodiments are able to detect distances between individuals or whether individuals are entering zoned area. If the distribution of those individuals fails to satisfy a distribution threshold (e.g., social distancing of at least 6 feet), the embodiments can trigger an alarm to inform the individuals that social distancing should be practiced. Other practical applications include detecting how fast vehicles or other objects are traveling, detecting speed traps, detecting accident prone areas, and so forth. Additional examples are provided in later sections of this disclosure.

Yet another improvement to the technical field is the ability to refrain from using a known pattern for the calibration process. Instead, the embodiments are able to utilize intelligence to calibrate the camera based on detected objects that are already in the scene. Further details regarding these and other benefits/improvements will be provided throughout this disclosure. Furthermore, the embodiments are beneficially able to calibrate a camera without prior information regarding the camera's characteristics.

Video Monitoring

Attention will now be directed to FIG. 1, which illustrates an example environment 100 in which a camera 105 is positioned. Here, the gravity vector 110 illustrates the direction of gravity relative to the camera 105. Camera 105 is shown as monitoring the environment 100. One will appreciate how environment 100 may be any type of environment, without limit. Examples include, but are not limited to, any type of retail, banking, office, indoor, or outdoor environment. Additionally, camera 105 may be any type of monitoring camera. For example, FIG. 2 illustrates different camera implementations.

Figure 2:
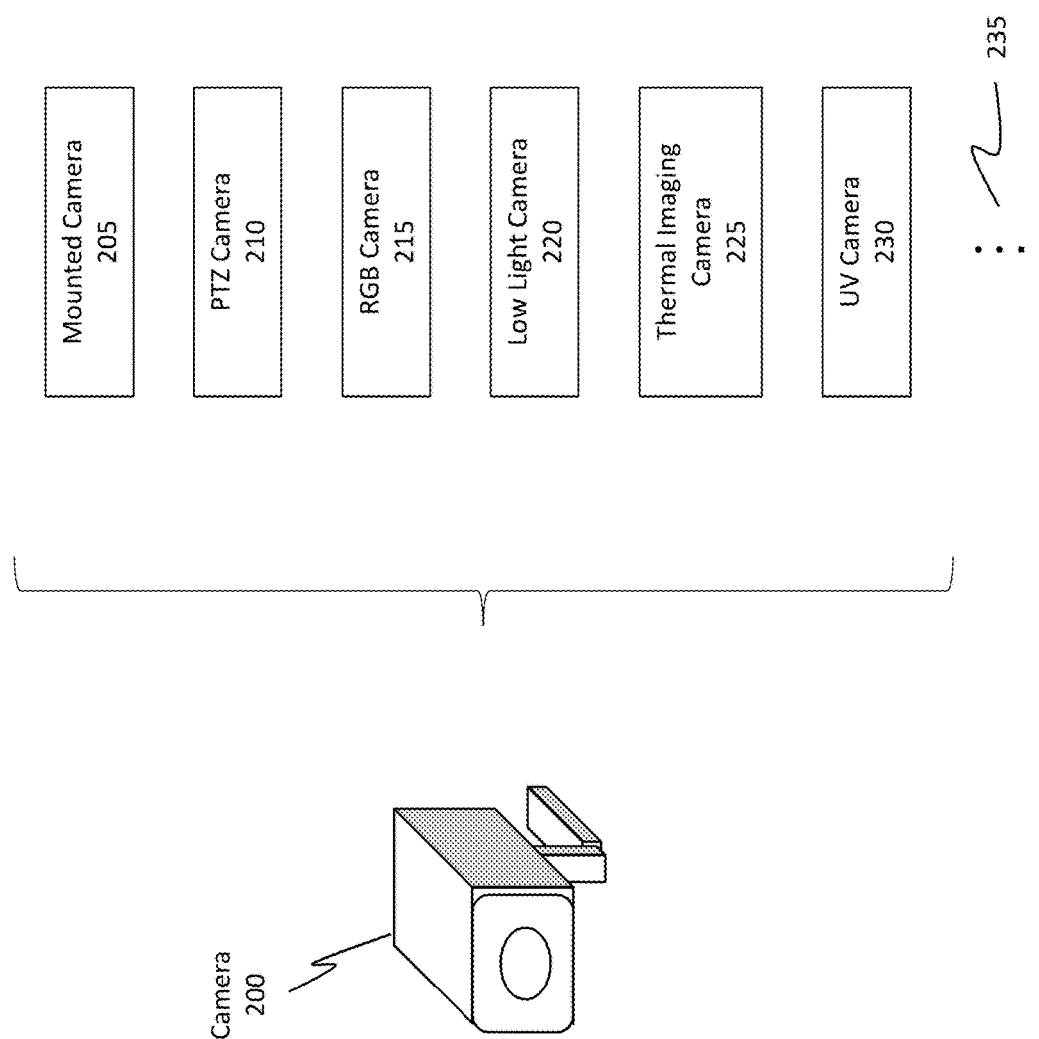
FIG. 2 illustrates how the camera can be structured in numerous different ways.

Specifically, FIG. 2 shows a camera 200, which is representative of the camera 105 of FIG. 1. Camera 200 can be embodied in different ways. For instance, camera 205 can be a mounted camera 205 (i.e. a camera mounted to a fixed position in an environment), or a pan, tilt, zoom PTZ camera 210. Camera 200 can also be a red, green, blue RGB camera 215, a low light camera 220, a thermal imaging camera 225, or an ultraviolet UV camera 230. In some cases, the camera 200 is a combination of these camera types (e.g., a PTZ camera that is also a RGB camera, or a low light camera, or a thermal imaging camera, or a UV camera).

Generally, a human eye is able to perceive light within the so-called "visible spectrum," which includes light (or rather, electromagnetic radiation) having wavelengths ranging from about 380 nanometers (nm) up to about 740 nm. As used herein, the RGB camera 215 is structured to capture light photons within the visible spectrum. Often, the RGB camera 215 is a complementary metal-oxide-semiconductor (CMOS) type camera, though other camera types may be used as well (e.g., charge coupled devices, CCD). In some embodiments, the RGB camera 215 can capture both visible light and infrared IR light.

The low light camera 220 is structured to capture visible light and IR light. IR light is often segmented into three different classifications, including near-IR, mid-IR, and far-IR (e.g., thermal-IR). The classifications are determined based on the energy of the IR light. By way of example, near-IR has relatively higher energy as a result of having relatively shorter wavelengths (e.g., between about 750 nm and about 1,000 nm). In contrast, far-IR has relatively less energy as a result of having relatively longer wavelengths (e.g., up to about 30,000 nm). Mid-IR has energy values in between or in the middle of the near-IR and far-IR ranges. The low light camera(s) 215 are structured to detect or be sensitive to IR light in at least the near-IR range.

One distinguishing feature between the RGB camera 215 and the low light camera 220 is related to the illuminance conditions or illuminance range(s) in which they actively operate. In some cases, the RGB camera 215 operates in environments where the illuminance is between about 10 lux and about 100,000 lux, or rather, the illuminance range begins at about 10 lux and increases beyond 10 lux. In contrast, the low light camera 220 often operates in environments where the illuminance range is between about 1 milli-lux and about 10 lux.

The thermal imaging camera 225 is structured to detect electromagnetic radiation or IR light in the far-IR (i.e. thermal-IR) range, though some embodiments also enable the thermal imaging camera 225 to detect radiation in the mid-IR range. To clarify, the thermal imaging camera 225 may be a long wave infrared imaging camera structured to detect electromagnetic radiation by measuring long wave infrared wavelengths. Often, the thermal imaging camera 225 detects IR radiation having wavelengths between about 8 microns and 14 microns. Because the thermal imaging camera 225 detects far-IR radiation, the thermal imaging camera 225 can operate in any illuminance condition, without restriction.

The UV camera 230 is structured to capture light in the UV range. The UV range includes electromagnetic radiation having wavelengths between about 10 nm and about 400 nm. The disclosed UV camera 230 should be interpreted broadly and may be operated in a manner that includes both reflected UV photography and UV induced fluorescence photography.

The ellipsis 235 shows how any other type of camera may be used as well, without limit. Accordingly, the disclosed principles may be practiced by any type of camera system.

Figure 3:
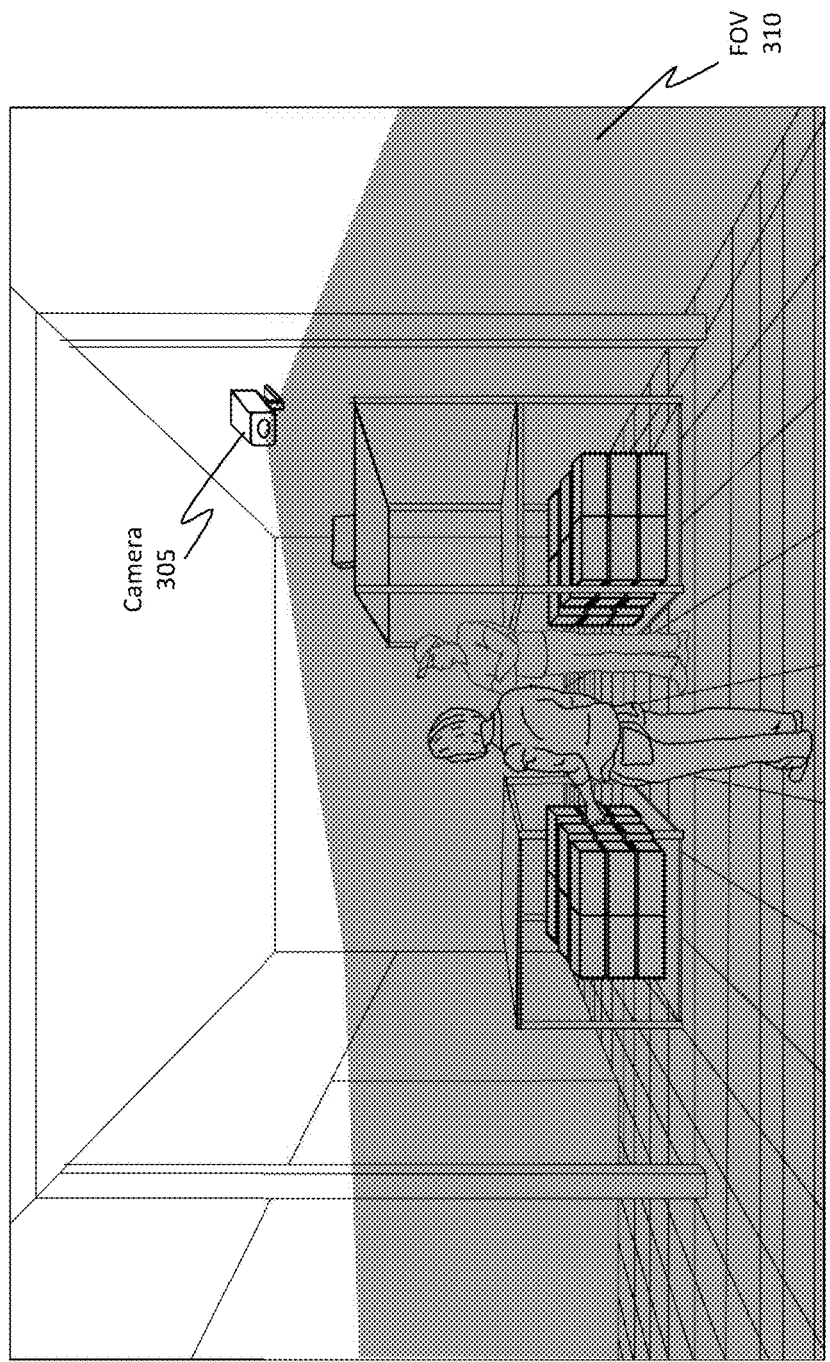
FIG. 3 illustrates how the field of view (FOV) of the camera can capture a wide area of the environment for monitoring purposes.

FIG. 3 shows an environment 300 and a camera 305, both of which are representative of their corresponding illustrations in FIG. 1. Here, however, FIG. 3 shows the field of view FOV 310 of the camera 305. The camera 305, which may be embodied as any of the cameras mentioned in connection with FIG. 2, can have a wide-angle lens, a narrow-angle lens, or any other type of lens configuration. Camera 305 can be a pinhole camera or any generic type of camera. In any event, the camera 305 captures image content based on its FOV 310, which generally refers to the area that is detected/monitored by the camera 305's sensor(s).

Figure 4:
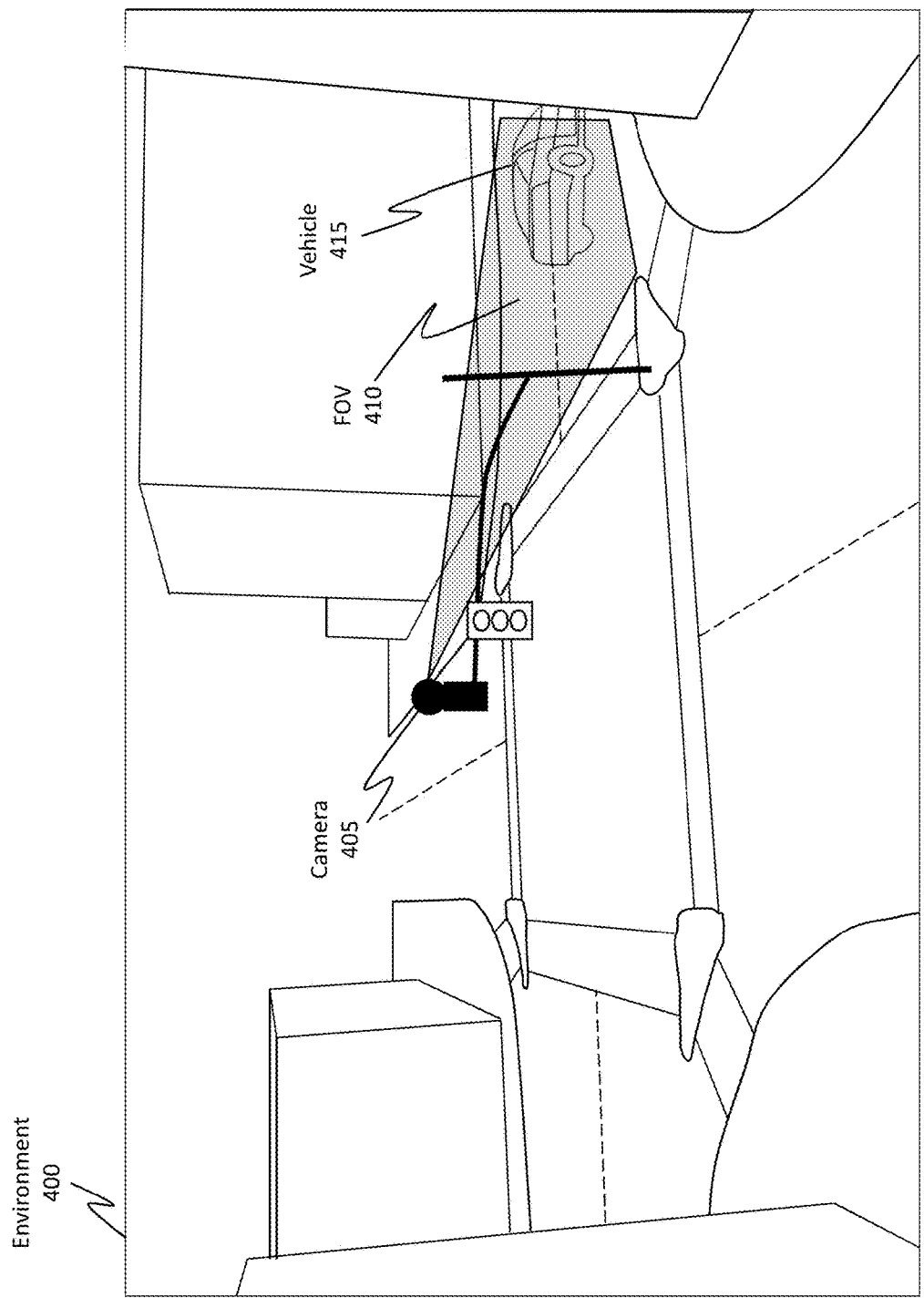
FIG. 4 illustrates another example scenario (e.g., a traffic monitoring scenario) in which a camera may be used.

FIG. 4 shows another example environment 400, which is an outdoor environment whereas environment 300 of FIG. 3 was an indoor environment. FIG. 4 also shows a camera 405, which is representative of the cameras discussed thus far, as well as the FOV 410 of camera 405. In this scenario, the camera 405 is monitoring traffic at an intersection. FIG. 4 shows how a vehicle 415 is currently in the FOV 410. Accordingly, the disclosed principles may be practiced in any type of environment, without limit.

Figure 5:
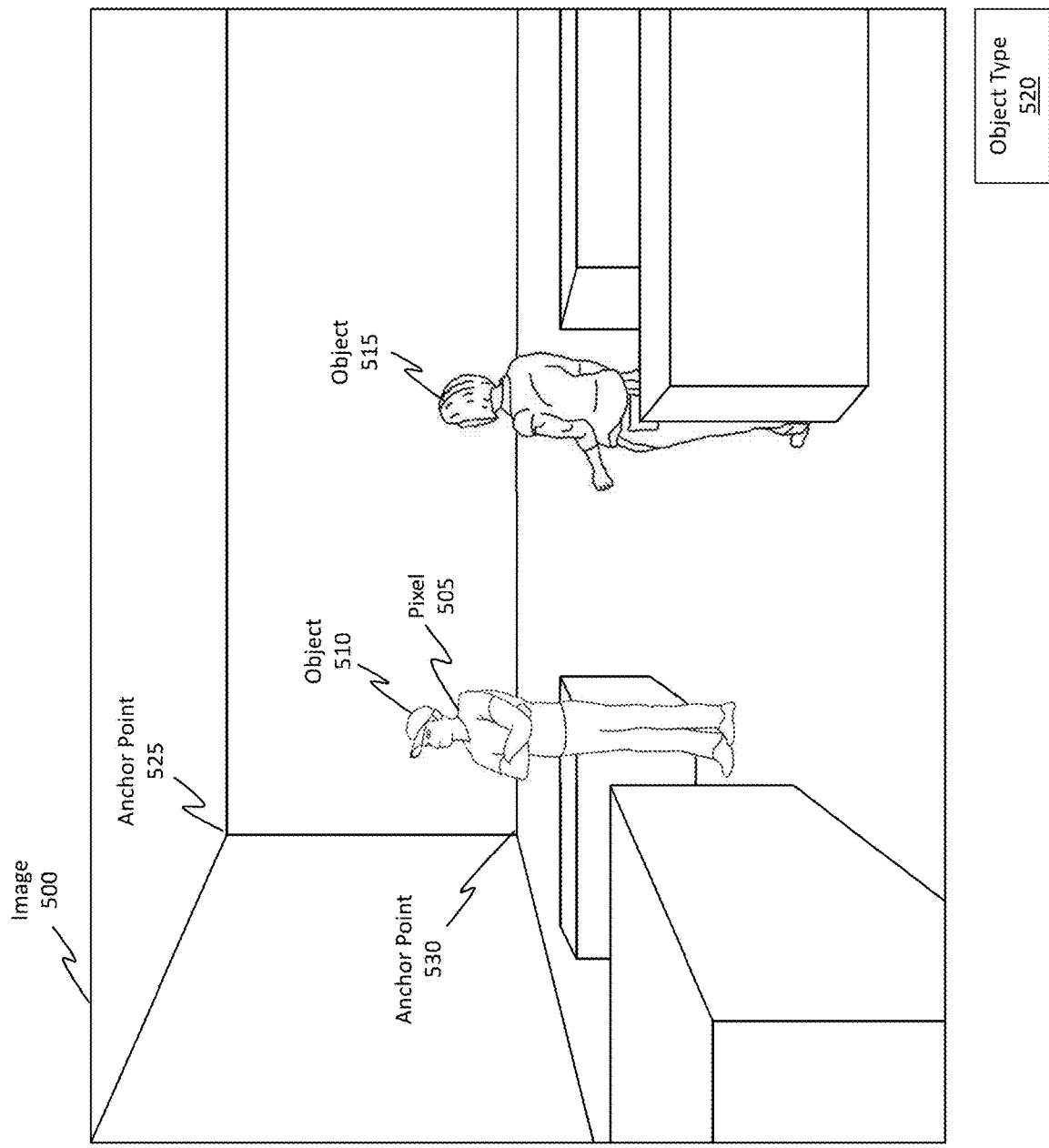
FIG. 5 illustrates an example of an image that may be generated by the camera.

FIG. 5 illustrates an example image 500, which may have been generated by any of the cameras discussed thus far. By way of example and not limitation, image 500 may have been generated by camera 305 of FIG. 3.

Image 500 is comprised of any number of pixels, such as pixel 505. The pixels may be analyzed and segmented to distinguish one pixel from another pixel. For instance, pixel 505 is included in a group of pixels representative of object 510, who is a man wearing a cap. Similarly, a different group of pixels can be segmented or grouped and identified as representing the object 515, who is a woman. The segmentation/analyzing process will be discussed in more detail later, but by way of a quick introduction, pixels in an image (e.g., image 500) may be segmented or identified and grouped together to represent identified objects. This segmentation or analyzing process may be performed via different types of machine learning, which will be discussed in more detail later.

The segmentation or analyzing process may result in identifying any number of different objects in the image 500. For instance, object 510 is one object and object 515 is a different object. As a part of the segmentation process, the embodiments are able to determine an object type 520 for each object in the image 500. By way of example, the object type 520 for object 510 may be that of a human. Similarly, the object type 520 for object 515 may also be that of a human. A number of tables, or rather, planar surfaces are also illustrated in image 500, though they are not labeled. These planar surfaces may also be segmented and identified, and an object type 520 may be assigned to them as well. Similarly, the walls may be identified and given the object type 520 of a "wall."

FIG. 5 also points out an anchor point 525 and an anchor point 530. As used herein, a so-called "anchor point" refers to a physical feature that is identified as being relatively static or stationary in character. For instance, the four points of a door frame are likely to be highly static (i.e. non-moving) whereas the door itself is not very static. In FIG. 5, anchor point 525 and anchor point 530 correspond to corners of the walls. Such corners are unlikely to move and can serve as an anchoring reference. Further details regarding anchor points will be provided later, but by way of a quick introduction, any number of anchor points (e.g., 2, 3, 4, 5, 6, 7, 8, 9, 10, 20, 30, 40, 50, or more than 50) may be detected in an image. The coordinates of these anchor points within the image can be determined and monitored over time. If the embodiments detect a change in these coordinates, then it may be the case that the camera has shifted pose. This detected shift in pose can then trigger a calibration event to occur. Accordingly, monitoring anchor points can be used to trigger calibration events.

Object Detection and Key Point Identification

Figure 6:
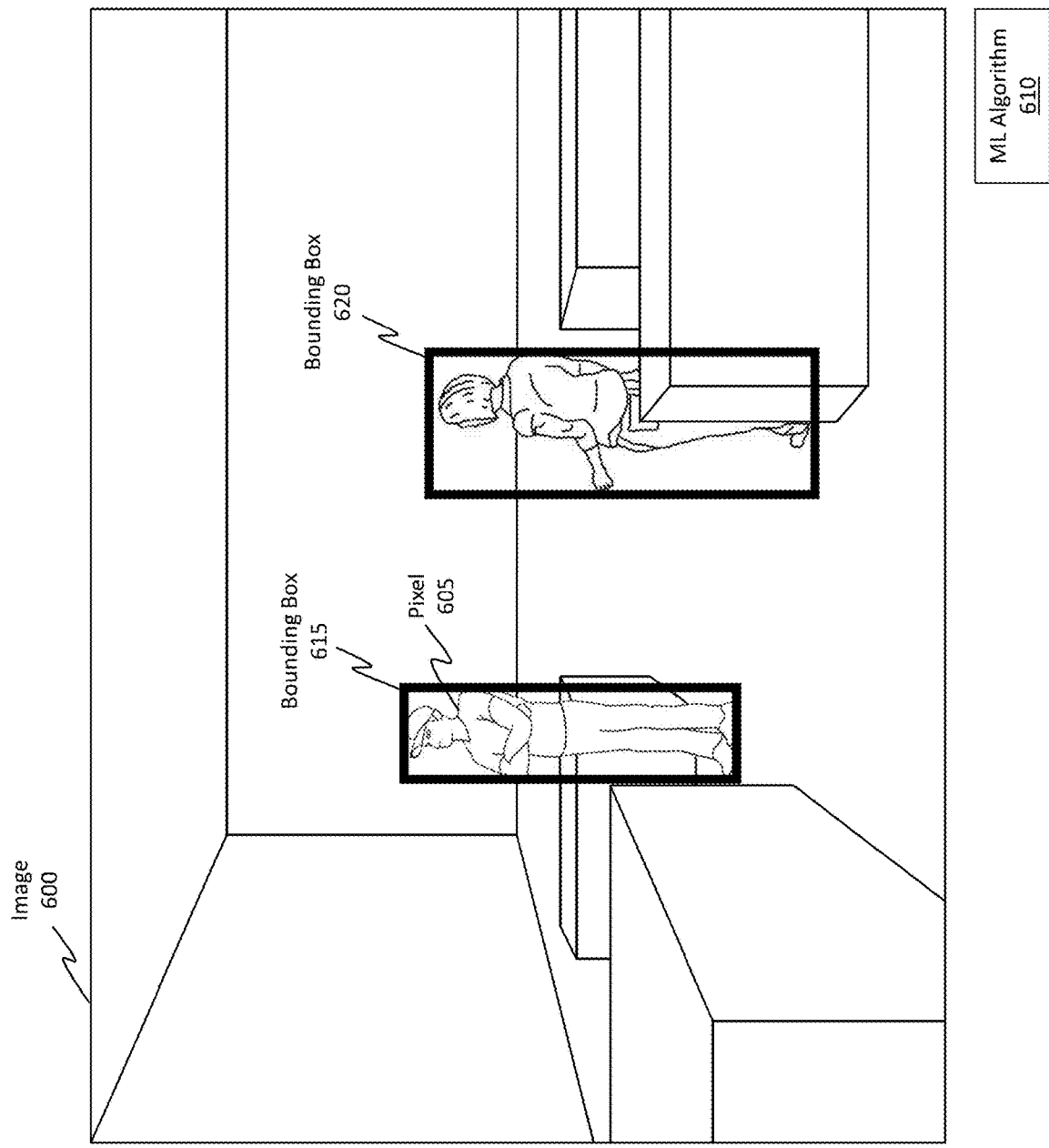
FIG. 6 illustrates how a bounding box may be generated to encompass image pixels corresponding to specific types of objects (e.g., perhaps a human).

FIG. 6 illustrates an example image 600, which is representative of the image 500 from FIG. 5. Similar to FIG. 5, image 600 is comprised of different pixels, including pixel 605. In accordance with the disclosed principles, a machine learning ML algorithm 610 or engine may be used to perform object segmentation on the image 600 to identify, segment, or distinguish objects from one another.

For calibration purposes (to be discussed in more detail later), it is advantageous to identify more samples (i.e. objects) as compared to fewer samples. For instance, tests have shown that detecting at least 7 objects and performing the disclosed operations recited herein provide for an improved calibration as compared to detecting less than 7 objects. More detection results in even improved calibration. In this regard, the embodiments are able to detect any number of objects (e.g., 5, 6, 7, 8, 9, 10, 15, 20, 30, 40, 50, 60, 70, 80, 90, 100, or more than 100) objects and perform the disclosed operations using those objects. One will appreciate how any single image may not have 100 objects included therein. As such, the embodiments are able to calibrate the camera using multiple different images having differing numbers of objects included therein. Additionally, using objects that are at different distributions in the image has also proven advantageous. For instance, clusters of objects in one instance and distributed objects in another instance provide benefits due to the diversity of the distributions.

The disclosed embodiments are able to use any type of machine learning or machine learning algorithm to segment objects in an image. As used herein, reference to any type of machine learning may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

The ML algorithm 610 may be trained to segment, identify, and classify objects in an image. In this case, the ML algorithm 610 has segmented two objects (though more objects may be segmented) and placed a bounding box around those objects. For instance, the ML algorithm 610 has placed a bounding box 615 around the man with the cap (or rather the pixels representative of the man) and has placed a bounding box 620 around the woman. These bounding boxes are generally polygons shaped to entirely encompass the pixels corresponding to an object, though other shapes (e.g., an oval) may also be used. Indeed, any type of polygon or shape may be used, but in this example scenario rectangles are being used.

Notably, the embodiments are able to segment objects even when those objects appear to overlap one another. For instance, the woman's leg is currently behind a counter. Despite part of her leg being occluded, the embodiments are still able to distinguish the woman from the counter and generate the bounding box 620 around the woman.

Figure 7:
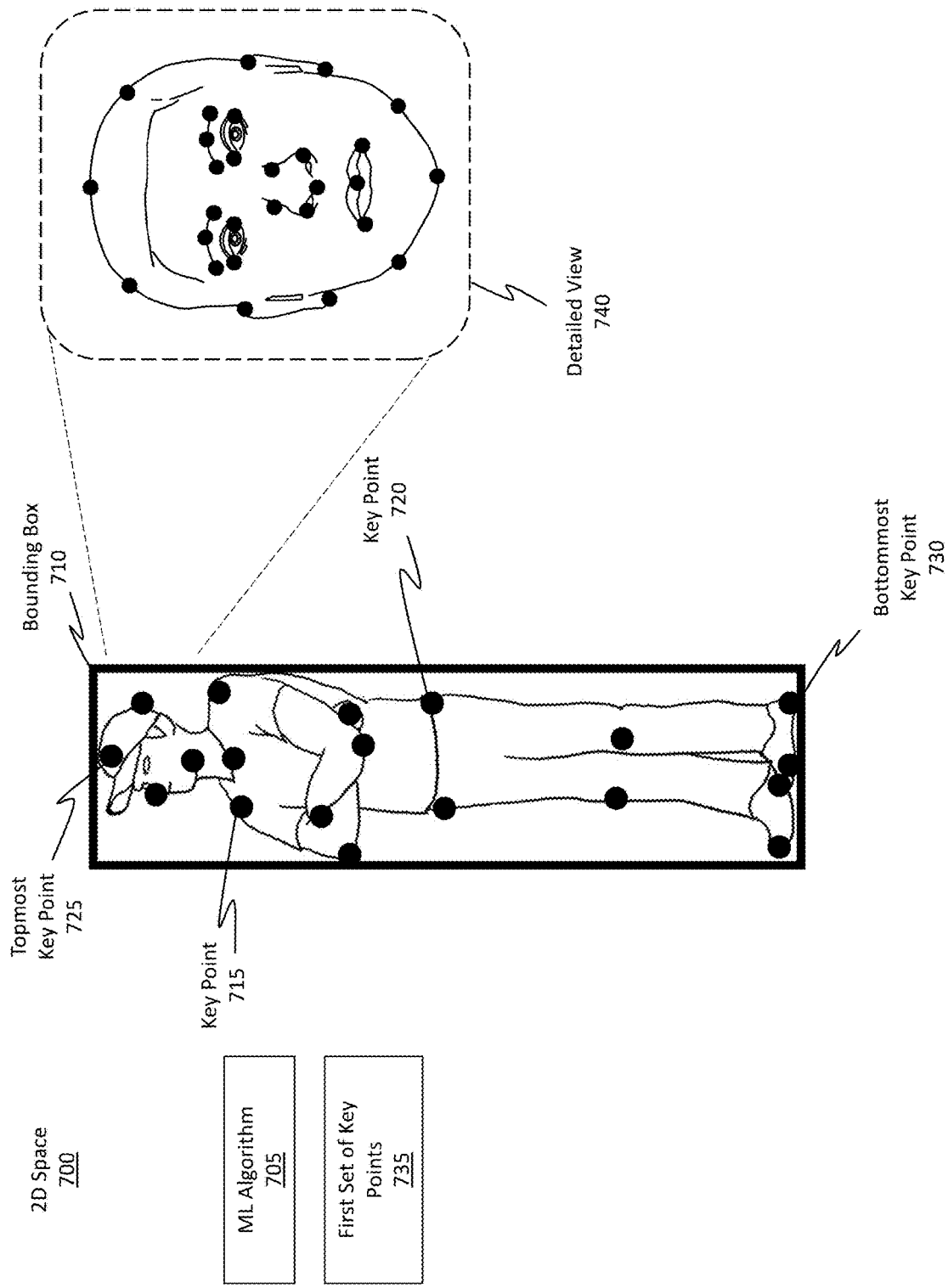
FIG. 7 illustrates how the bounding box may be used to then identify any number of key points for that object.

FIG. 7 shows a close-up view of the segmented man that was illustrated in FIG. 6. It should be noted how this image is still in the 2D space 700. In other words, the image that was originally generated by the camera system is a 2D image. FIG. 7 also shows the ML algorithm 705, which is representative of the ML algorithm 610 of FIG. 6, and the bounding box 710, which is representative of the bounding box 615.

In addition to segmenting objects and generating bounding boxes, the ML algorithm 705 is also configured to identify so-called "key points" of an object. As used herein, "key points" (aka "interest points") are spatial locations or points included within an image that define the boundaries, contours, geometries, and regions of an object. Key point detection refers to the process of detecting these key points within an image for a particular object. Stated differently, key points refer to the detectable features of an object. In accordance with the disclosed principles, any number of key points may be identified for an object. For instance, 1, 2, 3, 4, 5, 6, 7, 8, 9, 10, 20, 30, 40, 50, 60, 70, 80, 90, 100, 1,000, 2,000, 3,000, 4,000 or more than 4,000 key points may be identified for a single object. FIG. 7 shows a simplified illustration of a number of key points. Accordingly, the ML algorithm 705 segments the image by generating a bounding box around an object and by identifying the set of key points for that object.

FIG. 7 illustrates a key point 715 corresponding to one of the man's shoulders and a key point 720 corresponding to one of the man's hips. FIG. 7 also shows a topmost key point 725 corresponding to the top portion of the man's head and a bottommost key point 730 corresponding to the bottom portion of the man's foot. Other key points, as represented by the black circles, are illustrated at other locations of the man's body in the 2D space. The combination of these key points is referred to as a first set of key points 735. FIG. 7 also shows a detailed view 740 of the man's face, with corresponding key points. Accordingly, the ML algorithm 705 is able to segment image pixels and group them into objects. The ML algorithm 705 is then able to determine a type for the object (e.g., a human type, a vehicle type, a table type, a counter type, a wall type, etc.). The ML algorithm 705 is further able to identify any number of key points for each object detected in an image.

In some implementations, the process of segmenting the image to identify an object and its particular type includes first generating a bounding box encompassing pixels corresponding to that object. Subsequently, the process may include identifying the first set of key points of the object based on the bounding box (i.e. the key points are determined after the bounding box is generated).

Figure 8:
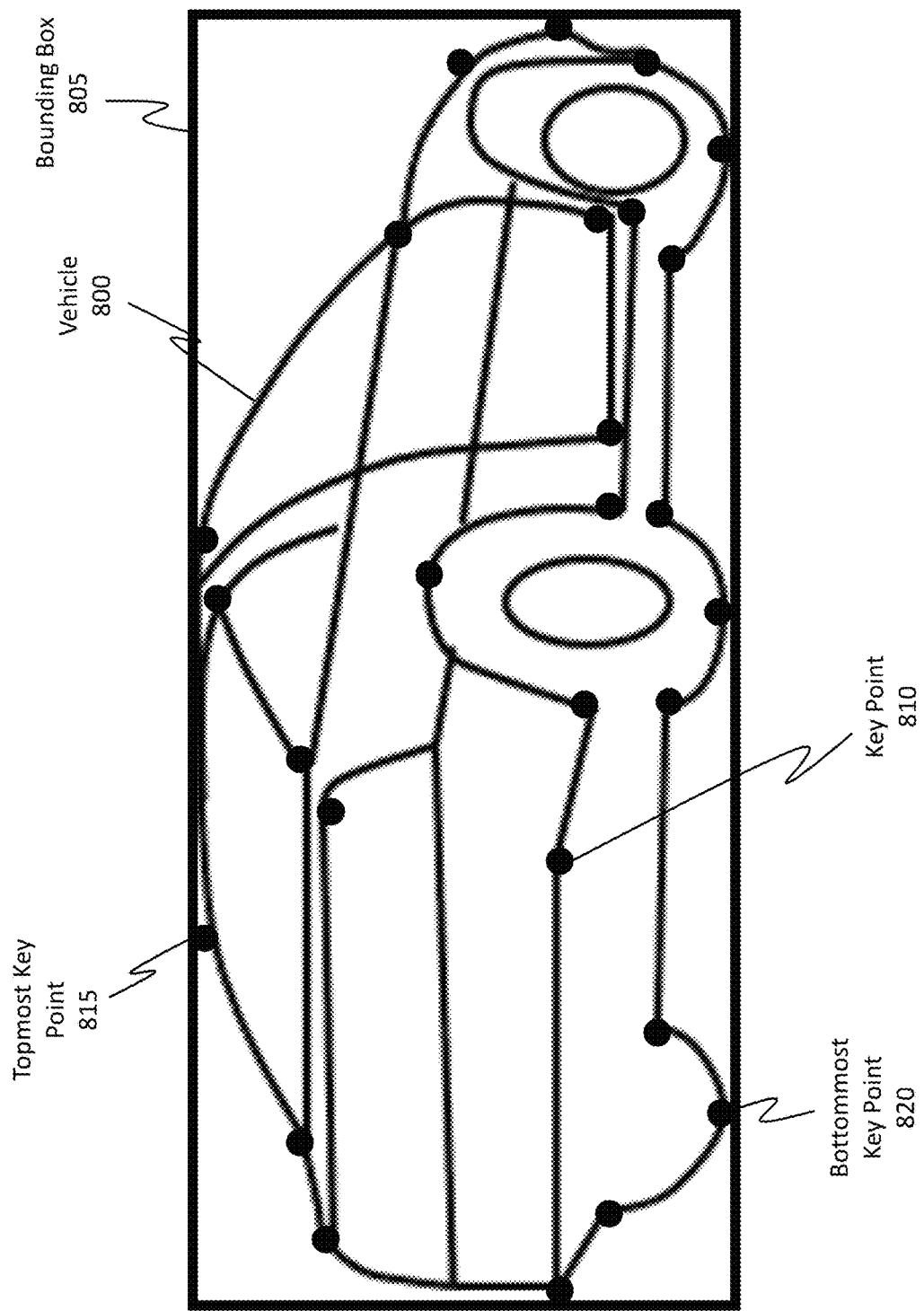
FIG. 8 illustrates an example scenario in which a vehicle has been identified via use of a bounding box and in which key points have been identified for that vehicle.

FIG. 8 illustrates another example object, in the form of a vehicle 800. Here, a bounding box 805 has been generated around the vehicle 800, and different key points (as represented by the dark circles) have been identified, including key point 810, topmost key point 815, and bottommost key point 820. Any type of object may be detected and any number of key points may be dynamically identified for that object in 2D space.

Accordingly, in some embodiments the object is a human, and the first set of key points includes a head key point corresponding to a head of the human and a foot key point corresponding to a foot of the human. In some embodiments, the object is a vehicle, and the first set of key points includes a top key point corresponding to a topmost portion of the vehicle (e.g., perhaps the car roof) and a bottom key point corresponding to a bottommost portion of the vehicle (e.g., the bottom of a wheel). In a general sense, however, the first set of key points includes a top key point corresponding to a topmost portion of the object and a bottom key point corresponding to a bottommost portion of the object.

Generating a Virtual Object

Figure 9:
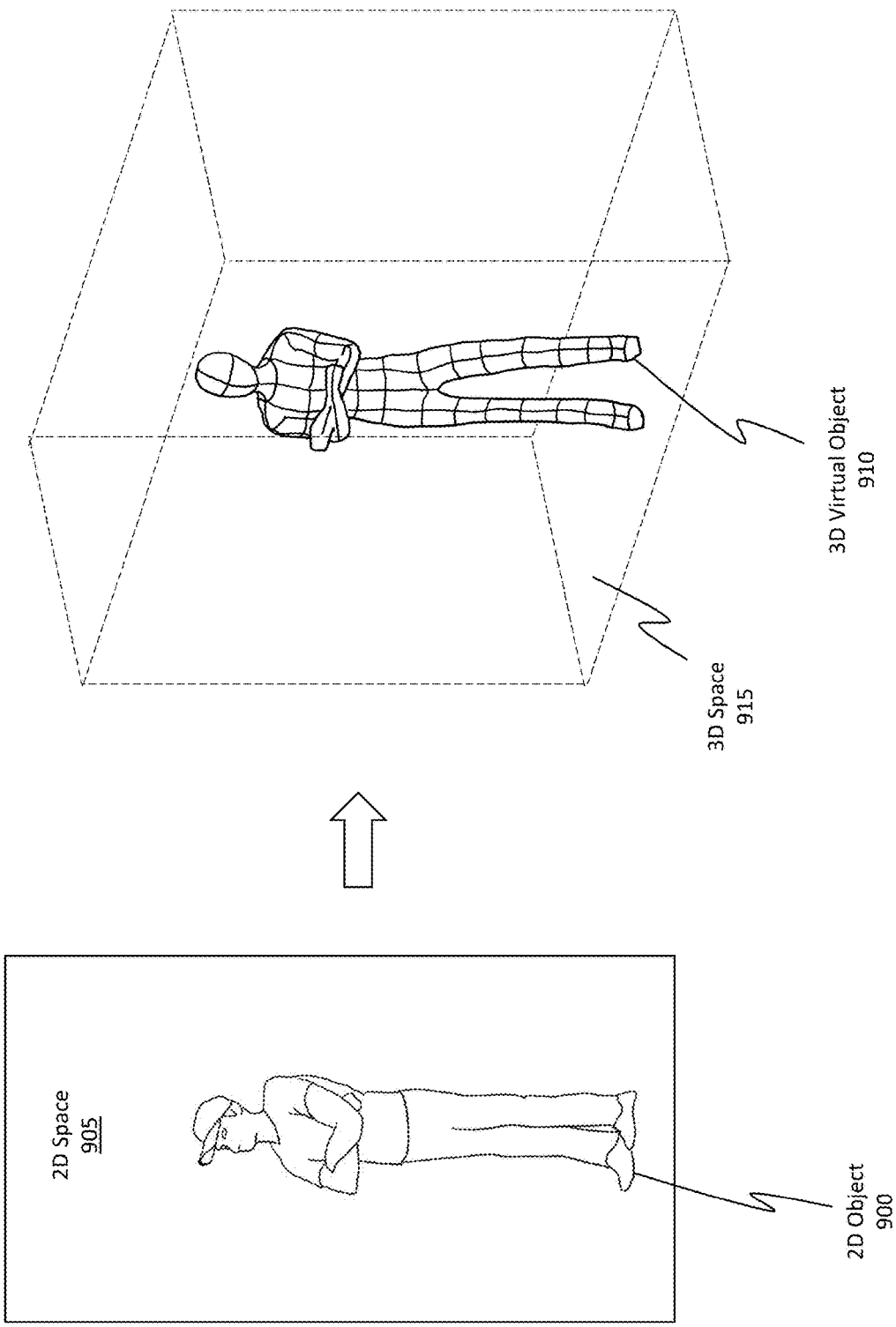
FIG. 9 illustrates an example implementation in which a virtual object is generated in 3D space, where this virtual object is designed to be of the same type as the object detected in the 2D image.

In accordance with the disclosed principles, the embodiments are able to generate a virtual 3D object corresponding to one of the 2D objects detected in an image. FIG. 9 is illustrative of this concept.

Specifically, FIG. 9 shows a 2D object 900, which corresponds to the object 510 of FIG. 5, represented in 2D space 905. Of course, the 2D object 900 may have been any of the objects that were detected by the ML algorithm in the images discussed earlier. The ML algorithm is able to analyze the objects in the image to determine their types and characteristics. The ML algorithm is then able to select specific objects corresponding to selected or specific types.

For instance, the ML algorithm may select objects that are of a human type or objects that are of a vehicle type or even objects that are of a door type. Notably, the ML algorithm selects objects that correspond to types having generally known features. To illustrate, although humans are highly diverse, on average most humans have similar structural or postural features (e.g., height, stature, shoulder width, neck length, etc.). Similarly, most doors are constructed to have certain common dimensions. Similarly, most stop signs are manufactured to meet certain sizing requirements. Similarly, the size and configuration of vehicles can be determined (e.g., either based on average metrics or perhaps by the ML algorithm querying the Internet to determine metrics of an identified vehicle's make and manufacture). In this regard, the embodiments actively search the image to identify objects and then intelligently select objects that have known average characteristics. Objects that might not have known average characteristics (e.g., because those objects may vary widely in their attributes, such as the varying attributes of an end table or a bar stool) can be filtered from consideration.

To more fully clarify, the embodiments intelligently select objects whose characteristics are generally known or determinable. On the other hand, the embodiments filter out other types of objects whose characteristics may not be readily determinable. By way of example, the counters (i.e. the planar surfaces) in FIG. 6 may be filtered from consideration (for the operations to be discussed shortly) because those dimensions may not be readily discernable or there might not be average values that can be attributed to those counters. On the other hand, the average size of a human male and female can be readily determined. Accordingly, the embodiments analyze the objects included within an image and then select or filter objects based on whether an average size or dimension can be attributed to that object. Further discussion on this aspect will be provided later.

Returning to FIG. 9, based on whichever object is selected (in this case, a human), the embodiments then identify a ground contact, which is a position where the 2D object 900 is contacting the ground plane. In this case, the human male's feet are contacting the ground plane, so the feet are considered to be the ground contact. Of course, if any other body part or object part is contacting the ground, then that body part will be the ground contact.

Stated differently, the embodiments are able to map the ground mass center of the detected object in the 2D image into the 3D ground space in order to define the location of this object in 3D space (which may be based on the gravity vector mentioned earlier). At this ground location in 3D space, the embodiments then generate a virtual object of the same particular type as the object.

To clarify, based on the filtering or the selection criteria/process, the embodiments then generate a 3D virtual object 910 in 3D space 915, where the 3D virtual object 910 is designed to correspond to the 2D object 900. For instance, because the 2D object 900 is a human male, the 3D virtual object 910 is generated based on average human male characteristics. If a vehicle were selected, then a 3D virtual vehicle would be generated. Similarly, if a human female were selected, then a 3D virtual human female would be generated. In any event, the embodiments generate a 3D virtualized version of the 2D object 900, where the virtualized version is initially generated based on an average set of characteristics identified for that 2D object. Further details on that aspect will be provided momentarily.

In some cases, the 3D virtual object 910 includes complex features, contours, and geometries corresponding to the features, contours, and geometries detected in the 2D object 900. In some cases, the 3D virtual object 910 is a simplified 3D virtual object. Using a human as an example, the resulting 3D virtual object may be a simple sphere for the human's head and cylinder for the human's body and potentially legs. In other cases, the resulting 3D virtual object may be complex and represent distinct features of the human's body. For instance, in FIG. 9, the 2D object 900 is a human male crossing his arms. Similarly, the 3D virtual object 910 illustrates a human male with crossed arms.

Figure 10:
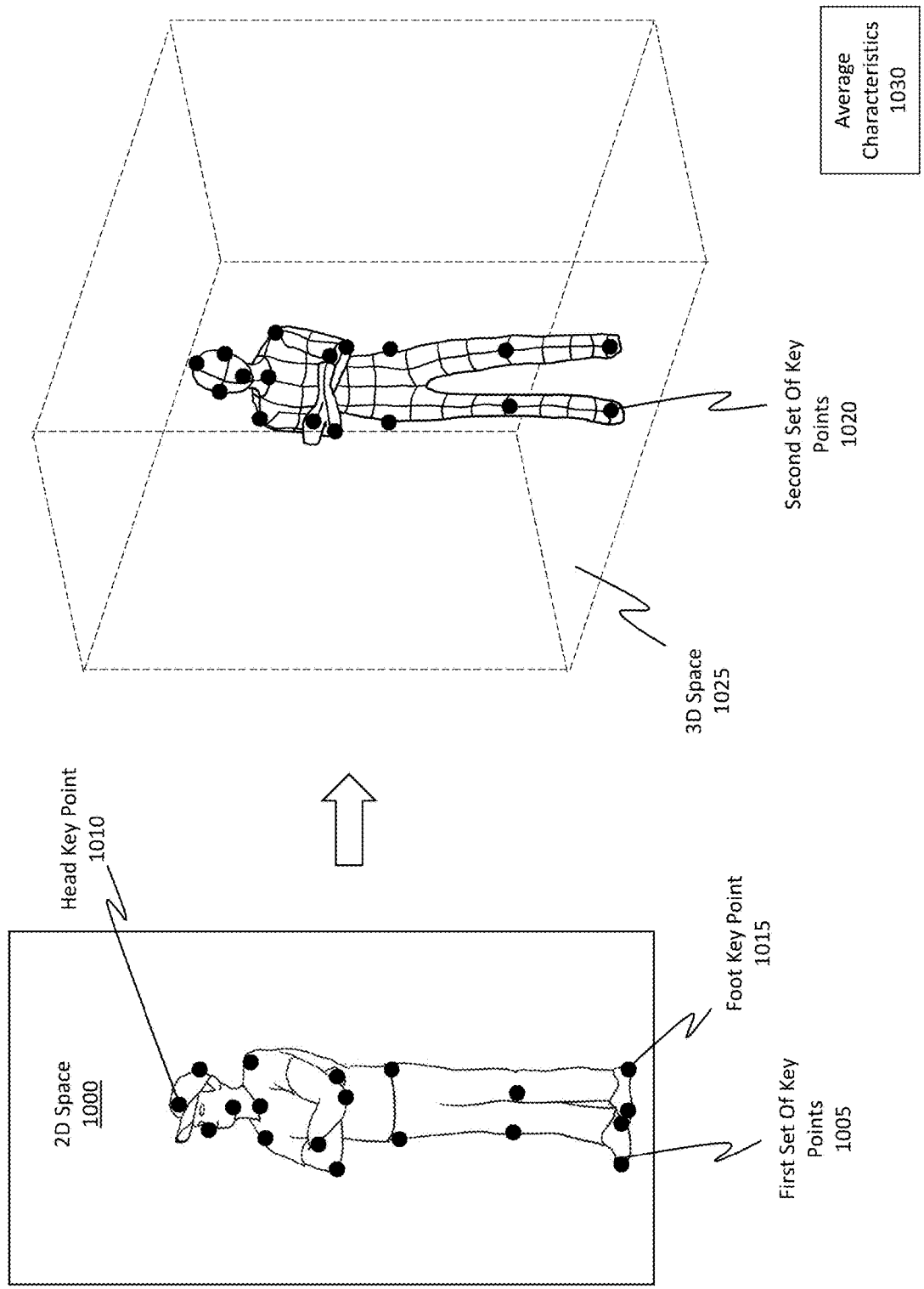
FIG. 10 illustrates how any number of key points may be generated for the 3D virtual object.

FIG. 10 further expands on the concepts taught in FIG. 9. Specifically, FIG. 10 again shows the 2D human male in 2D space 1000. Now, however, the first set of key points 1005, including a head key point 1010 and a foot key point 1015 as well as other key points (as represented by the dark circles), are also illustrated. The first set of key points 1005 corresponds to the first set of key points 735 from FIG. 7.

The embodiments (e.g., perhaps the ML algorithm) are further configured to generate a second set of key points 1020 in 3D space 1025 for the 3D virtual object corresponding to the 2D object. For instance, the dark circles in the 3D space 1025 are labeled as being the second set of key points 1020. This second set of key points 1020 is generated based on the average characteristics 1030 of the identified 2D object (in this case a human male). The average characteristics 1030 may be any type of average characteristic based on the identified object.

By way of example and not limitation, the average characteristics 1030 may include human height (male or female), weight, shoulder width, neck length, arm length, leg length, torso length or width, head size, hand size, arm thickness, leg thickness, and so forth. In the context of a vehicle, the average characteristics 1030 may be vehicle height, length, volume, weight, wheel well size or height, wheel size, door size, trunk size, hood size, window size, and so forth. Indeed, any number or type of average characteristics may be determined for any type of object included within an image. In this regard, the second set of key points 1020 may be based on the average characteristics 1030 that are determined for objects of a particular type (e.g., in this case a human male).

Figure 11:
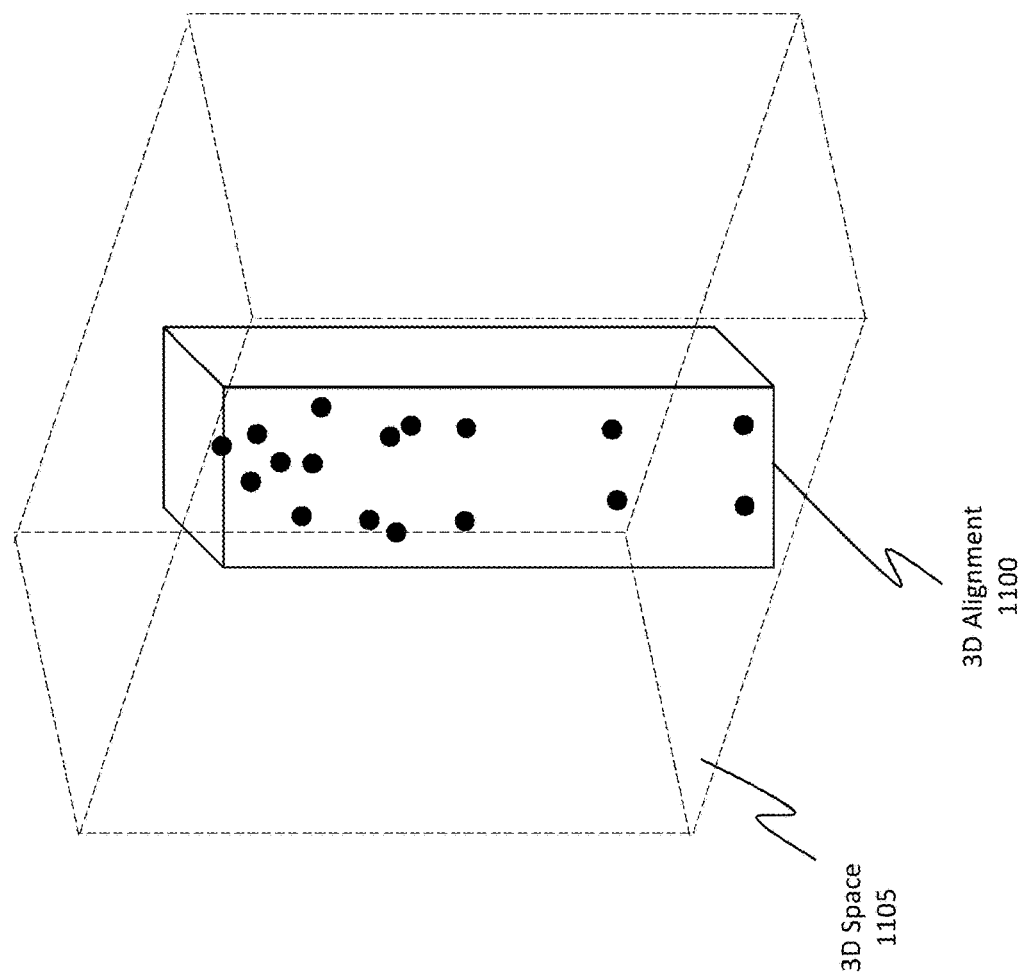
FIG. 11 illustrates how the compilation of the 3D virtual object's key points defines a particular alignment or arrangement corresponding to a virtual physical positioning or orientation of the 3D virtual object.

FIG. 11 illustrates an example 3D alignment 1100 of the second set of key points 1020 of FIG. 10 in 3D space 1105. In this example, the virtually generated 3D object has been omitted to simplify the figure. In any event, the arrangement or alignment 1100 of the key points in 3D space 1105 represents the orientation, pose, posture, or positioning of the corresponding 3D virtual object. As will be discussed in more detail momentarily, the 3D virtual object is generated in an effort to have its key points (after being reprojected into 2D space) coincide, mimic, match, or fit the positioning of the 2D object's key points.

Dynamically Modifying 3D Alignments

The term "pose" refers to a 3D orientation of an object. As such, it would be improper to say that the 2D object has a pose. When calibrating a camera, however, it is highly beneficial to use 3D information to determine the camera's calibration parameters (e.g., camera height, tilt angle, focal length, distortion matrix, etc.). Therefore, as discussed earlier, it is beneficial to operate in 3D space because it provides enhanced opportunities to calibrate the camera.

The embodiments, therefore, generate a 3D virtual object that has a 3D pose. This 3D pose is an estimated pose that is designed to mimic how the 2D object would look if that 2D object were represented in 3D space. Once the estimated 3D virtual object is generated, then it is reprojected into 2D space, along with its corresponding set of key points (i.e. the second set of key points are reprojected from 3D space into 2D space). Now that a virtual 2D object has been generated, that 2D virtual object's key points can be compared against the key points from the original object. Differences between the locations or coordinates of these key points can be identified. If the differences are within a satisfactory threshold of one another, then it means that the estimated pose of the 3D virtual object accurately corresponded to the 2D object, or rather, the 3D virtual object (after being reprojected into 2D space) "fits" the original 2D object.

Figure 12:
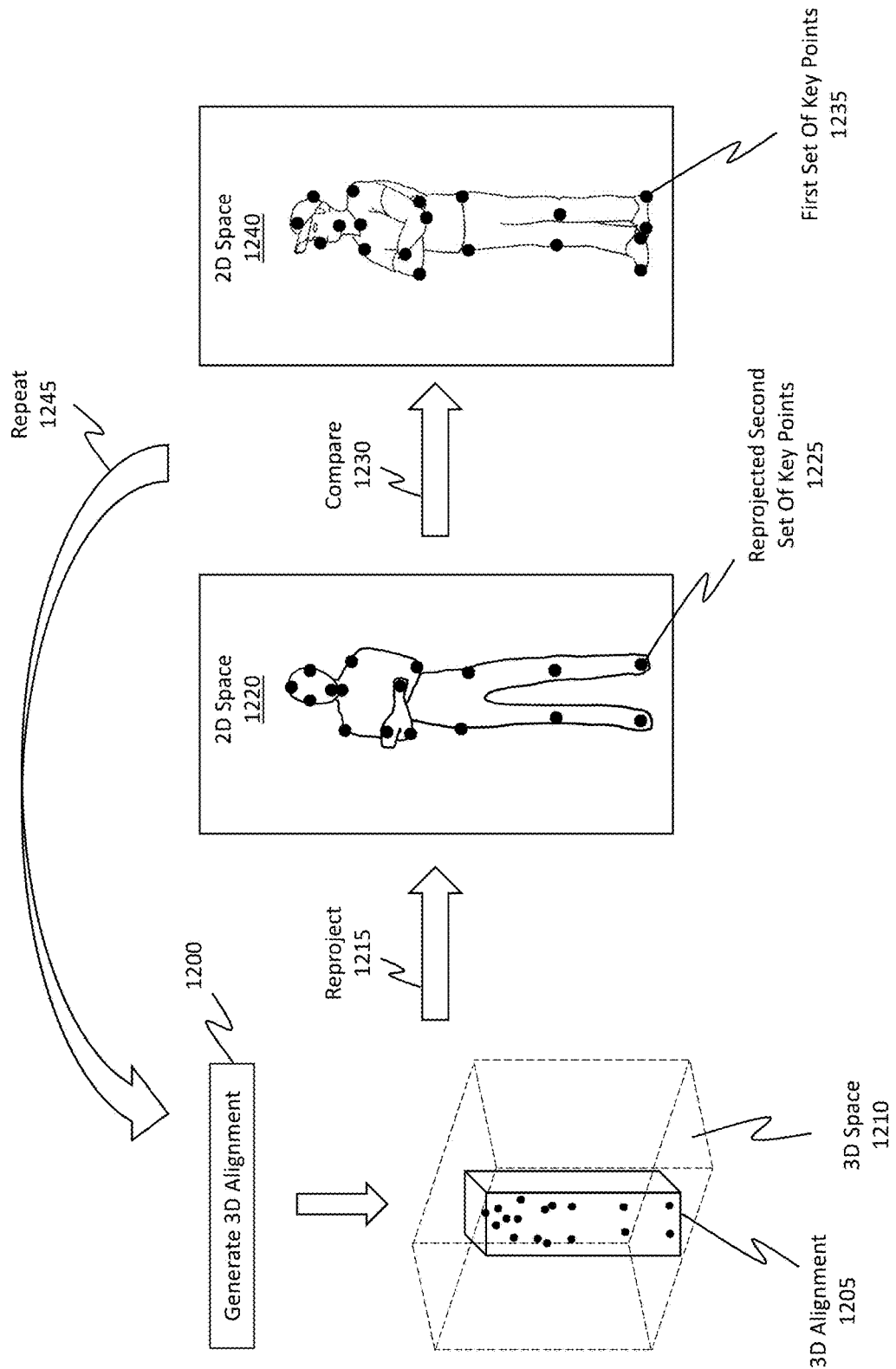
FIG. 12 illustrates how the 3D object's key points can be reprojected from 3D space into 2D space to generate a 2D reprojected object, which is then compared against the original object.

If the differences were beyond the threshold, then the estimated pose was off. In such a case, the embodiments are able to modify the 3D pose to generate a new pose that is based on the computed difference values (e.g., perhaps the 3D virtual human male's shoulder was too high, so the next pose lowers the shoulder). These modification and comparison processes may continue until the computed differences satisfy the threshold values. By performing these processes, the embodiments are able to acquire a set of reprojection parameters, which may be used to calibrate the camera. FIG. 12 is illustrative.

FIG. 12 illustrates an example operation 1200 of initially generating a 3D alignment, as described in FIGS. 9-11. The result of this generation is a 3D alignment 1205 in 3D space 1210, as discussed previously. The embodiments then reproject 1215 the 3D alignment 1205 from 3D space 1210 into 2D space 1220. As used herein, the term "reproject" should be interpreted broadly to include any technique for converting 3D data into 2D data. Example techniques include rasterization (i.e. the process of determining 2D pixel coordinates for 3D objects), ray-tracing, and perspective projection. Consequently, a reprojected second set of key points 1225 are generated, where these key points are now in the 2D space 1220. By way of additional clarification, the reprojected second set of key points 1225 are key points that are now in 2D space and that correspond to the key points that were originally in 3D space.

The reprojected second set of key points 1225 now outline, define, or represent a 2D virtual object, which corresponds to the 3D virtual object that was previously generated (e.g., 3D virtual object 910 from FIG. 9). To clarify, the 2D virtual object is now in 2D space and is outlined or defined by the reprojected second set of key points 1225.

The embodiments then compare 1230 the positioning/coordinates of the reprojected second set of key points 1225 against the first set of key points 1235 (corresponding to the first set of key points 1005 in FIG. 10) in 2D space 1240. By "coordinates," it is meant the pixel's positional coordinates within an image. As will be discussed in more detail momentarily, this generation and comparison process may repeat 1245 any number of times until the reprojected second set of key points 1225 fit the first set of key points 1235.

Figure 13:
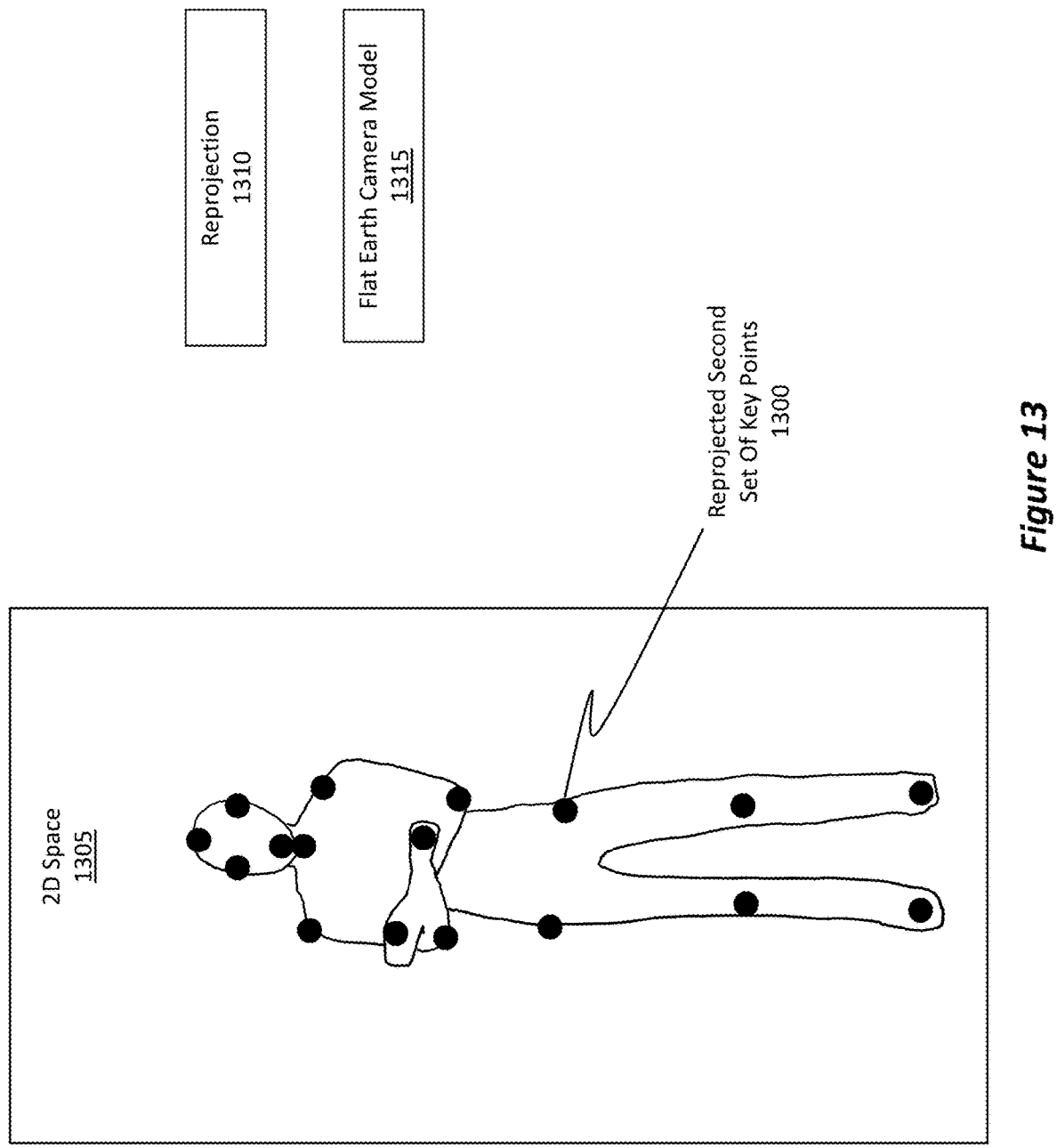
FIG. 13 illustrates how the reprojection of the key points of the 3D virtual object from 3D space to 2D space may be performed using a (simplified) flat earth camera model.

Turning briefly to FIG. 13, there is shown a reprojected second set of key points 1300 in 2D space 1305. These key points correspond to the reprojected second set of key points 1225 in FIG. 12. FIG. 13 also shows a reprojection 1310 operation, which is representative of the reproject 1215 operation, and a flat earth camera model 1315.

In accordance with the disclosed principles, the embodiments perform the reprojection 1310 operation (i.e. the transition from 3D space to 2D space) based on the assumption that the ground is flat, which is represented by the flat earth camera model 1315. For instance, with reference to FIG. 5, when the embodiments perform the reprojection, the embodiments impose an assumption that the ground on which the objects (e.g., object 510) are resting is a flat ground as opposed to an uneven or curved ground. Making this assumption simplifies the reprojection 1310 operation. Accordingly, FIG. 13 generally relates to an embodiment that utilizes the flat earth camera model 1315 when performing reprojections.

Figure 14:
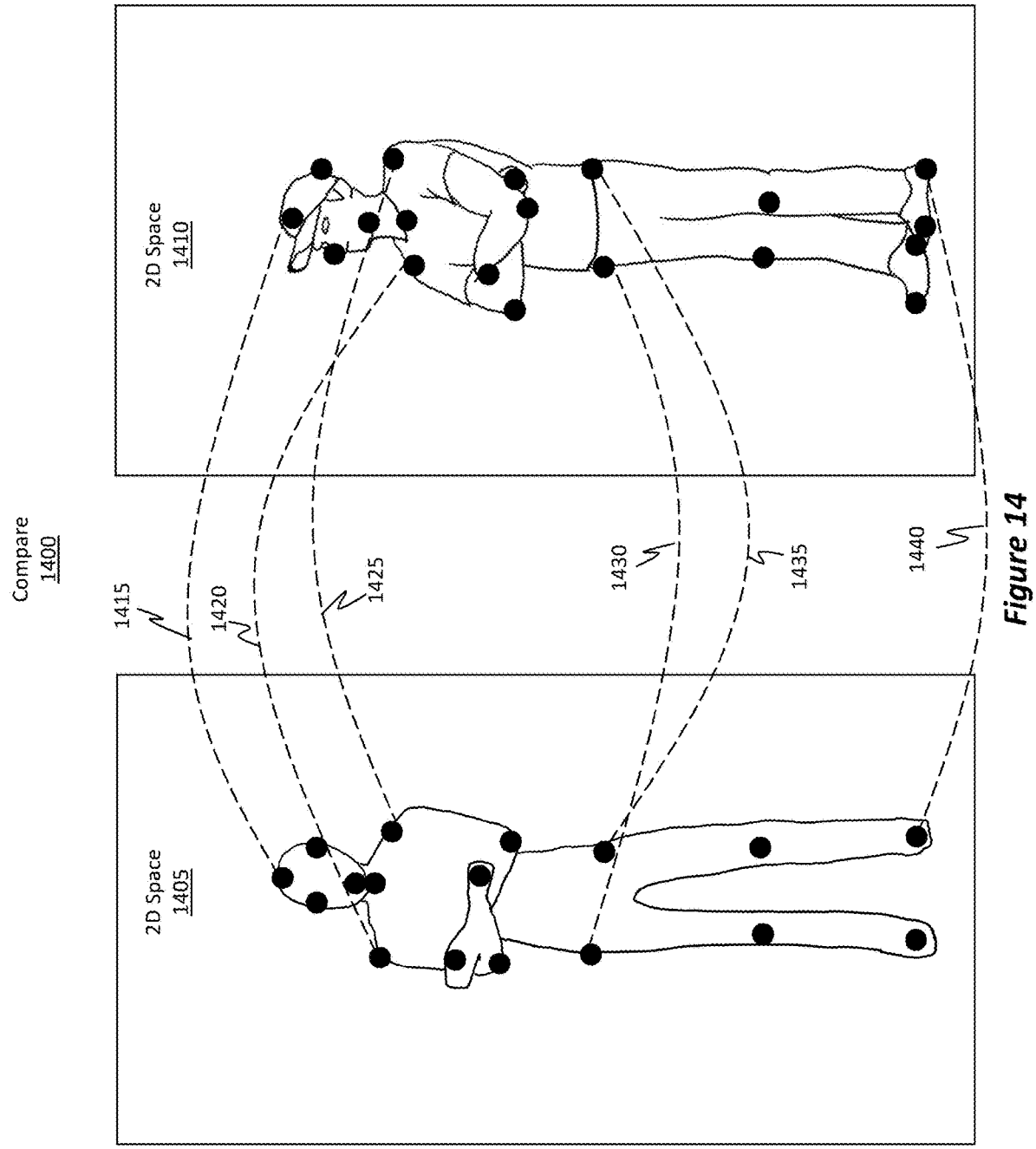
FIG. 14 illustrates an example of the comparison process used to determine whether the reprojected key points fit to the key points of the original object.

Turning now to FIG. 14, this figure provides additional clarification regarding the compare 1400 process, which is representative of the compare 1230 process described in FIG. 12. FIG. 14 shows the reprojected second set of key points on the left-hand side (in 2D space 1405) and the first set of key points on the right-hand side (also in 2D space 1410). The compare 1400 process can be performed by comparing the coordinates of common key points to one another. For instance, operation 1415 is shown as comparing the topmost key point from the left against the topmost key point from the right. Similarly, operation 1420 is shown as comparing a key point for one shoulder of the 2D virtual human against a corresponding key point for the shoulder of the original object. Operation 1425 is comparing the key points for the other shoulder. Operations 1430 and 1435 are comparing corresponding key points for the hips, and operation 1440 is comparing the key points for the feet. Although only 6 comparison operations are displayed, one will appreciate how any number of comparisons may be performed.

Figure 15:
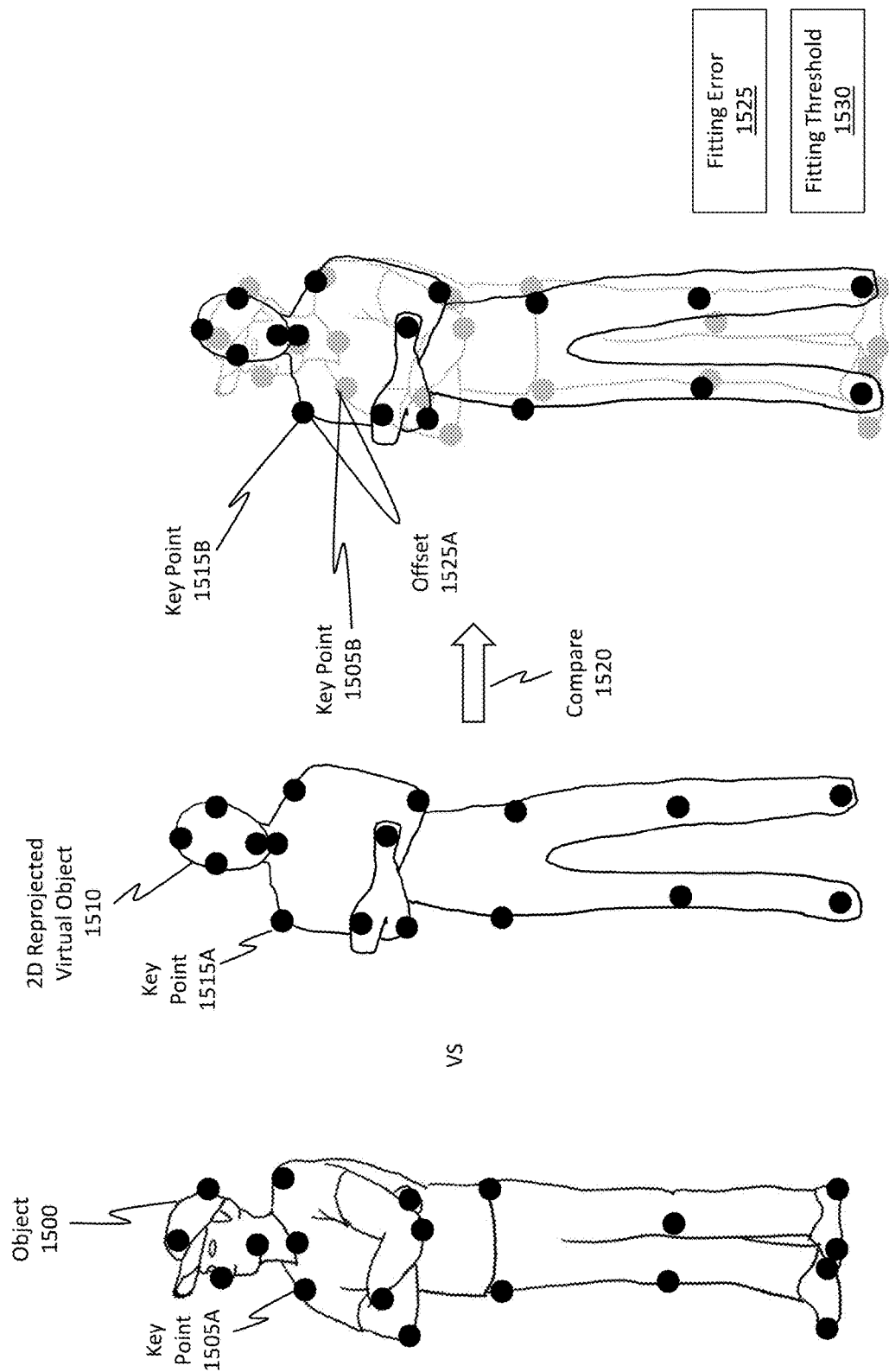
FIG. 15 provides another useful illustration of the comparison and fitting process.

FIG. 15 provides another example illustration of this comparison process. Here, object 1500, which is representative of the other objects discussed thus far, is illustrated with a key point 1505A on the human male's shoulder. Similarly, a 2D reprojected virtual object 1510, which is representative of the other 2D reprojected virtual objects discussed thus far, is illustrated with a key point 1515A on the shoulder. Previously, the embodiments generated a 3D virtual object whose pose was designed to estimate or coincide with the pose of the 2D object (if that 2D object had been in 3D space). The embodiments then compare 1520 the coordinates of these key points against one another.

To illustrate, the 2D reprojected virtual object 1510 is shown in FIG. 15 as being overlaid on top of the object 1500 on the righthand side of the figure. The key point 1505B corresponds to the key point 1505A, and the key point 1515B corresponds to the key point 1515A. Based on this overlaid visualization, one can discern how the key point 1515B is offset relative to the key point 1505B. Stated differently, the coordinates in the 2D space of the key point 1515B are offset by some value relative to the coordinates of the key point 1505B. This offset constitutes a so-called fitting error 1525, which is based on a detected offset 1525A between the coordinates of the key points of the 2D reprojected virtual object (e.g., the coordinates of the key point 1515B) relative to the coordinates of the first set of key points (e.g., the coordinates of the key point 1505B). "Coordinates" generally refers to the x-y location of the pixel relative to the image. If the fitting error 1525 exceeds a fitting threshold 1530, then the embodiments are triggered to generate a new 3D alignment for the 3D virtual object in an attempt to reduce the subsequently computed fitting error 1525 for that new alignment.

Figure 16:
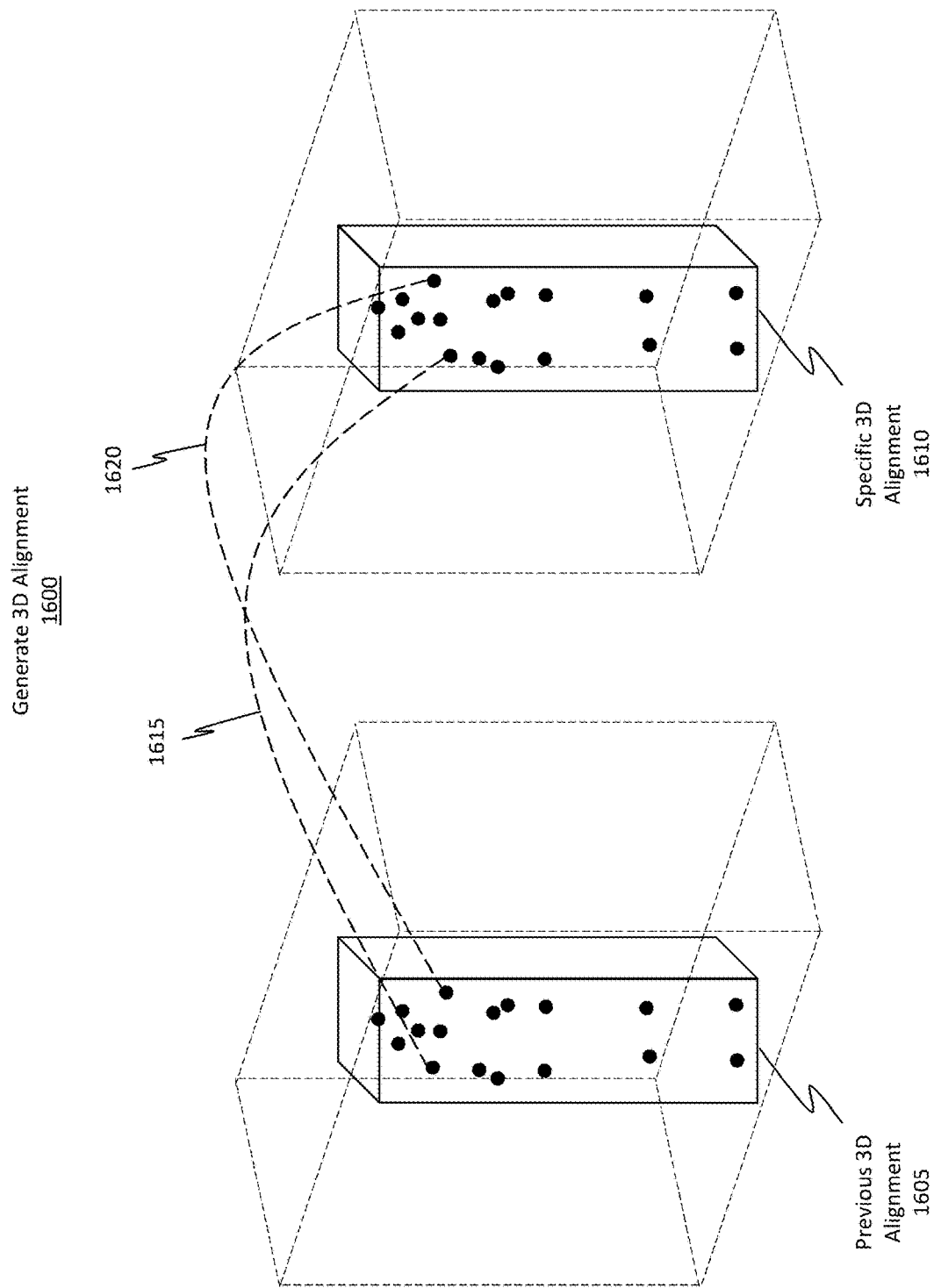
FIG. 16 illustrates how the alignment of the key points may be rearranged or realigned in 3D space to effectively cause the pose of the 3D virtual object to change in an attempt to fit that new alignment (after reprojection) to the original object in 2D space.

As a result of the fitting error 1525 exceeding the fitting threshold 1530, the repeat 1245 operation of FIG. 12 is now triggered. That is, the embodiments will now generate a new 3D alignment for the 3D virtual object in an attempt to reduce the fitting error 1525 that will subsequently be determined when reprojection and comparison occurs. FIG. 16 shows how the new 3D alignment may be performed.

As was shown in FIG. 15, the shoulders of the 2D reprojected virtual object 1510 were not aligned or fitted with the shoulders of the object 1500. The current examples are focused on a human object, but one will appreciate how the principles may be equally applied to other types of objects (e.g., vehicles, signs, etc.). Based on the fitting error 1525 for each of potentially any number of key points (e.g., each key point may be associated with its own corresponding fitting error), the embodiments modify the 3D alignment of the key points for the 3D virtual object.

To illustrate, FIG. 16 shows how to generate a 3D alignment 1600. FIG. 16 illustrates a previous 3D alignment 1605, which was the 3D alignment 1205 of FIG. 12. Notably, the actual virtual object is being omitted to keep the figures simple.

The embodiments are able to modify the previous 3D alignment 1605 to generate a new specific 3D alignment 1610. Whereas previously the shoulders of the previous 3D alignment 1605 had too high of an offset relative to the shoulders of the original object, the modification 1615 and modification 1620 show how the shoulder orientations, poses, or alignments have been modified in an effort to reduce the fitting error that occurred earlier. As a specific example, the left key point (and hence the shoulder) is lowered in the specific 3D alignment 1610 as shown by the modification 1615. Similarly, the right key point (and hence the shoulder) is raised in the specific 3D alignment 1610 as shown by the modification 1620. Of course, any number of additional modifications to the 3D alignment may have been performed in an effort to reduce the fitting error that was previously computed and that will subsequently be computed again once the reprojection process has been performed.

After the modifications are performed, the processes described in connection with FIG. 12 are performed again. For instance, the newly modified 3D virtual object, including its 3D alignment (i.e. the key points), are reprojected into 2D space and then those key points are compared against the key points of the original object.

Figure 17:
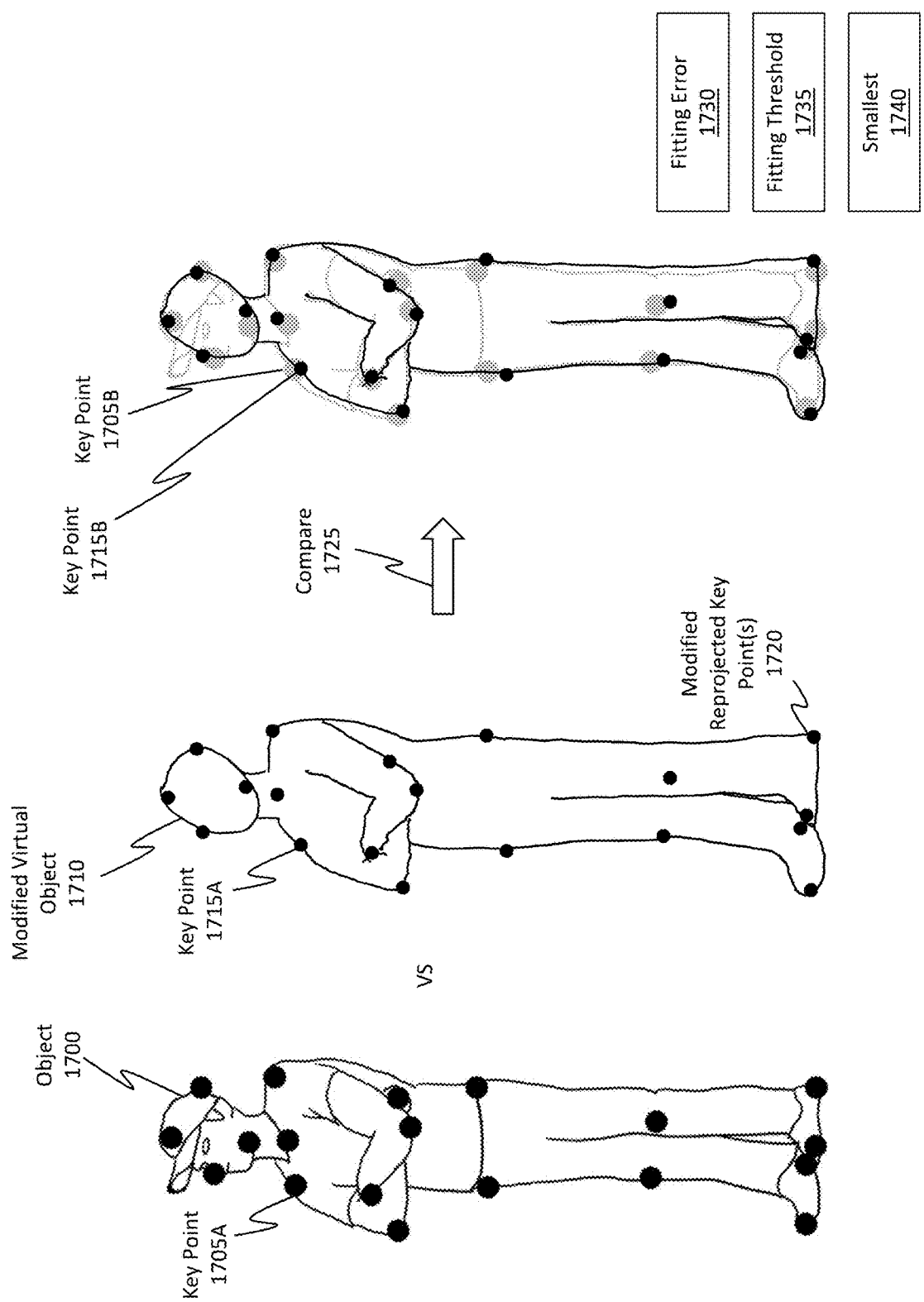
FIG. 17 illustrates how, as a result of modifying the key points in 3D space, the new alignment (after reprojection) more closely fits the original object's key points in 2D space.

FIG. 17 shows a similar process as to the process that was illustrated in FIG. 15. Now, however, the comparison process is performed using the modified alignment of the key points for the 3D virtual object.

Specifically, FIG. 17 again shows the original object 1700 as well as a key point 1705A (e.g., the shoulder). Also shown is the modified virtual object 1710, which is a reprojected version (from 3D into 2D) of the 3D virtual object whose alignment, pose, or orientation has been modified. FIG. 17 shows a key point 1715A for the modified virtual object 1710. The set of key points for the modified virtual object 1710 constitute modified reprojected key point(s) 1720. The compare 1725 process is again performed. FIG. 17 shows an overlaid visualization of the modified virtual object 1710 overlaid on top of the object 1700 on the righthand side of the figure.

From this overlaid visualization, one can detect how the key point 1715B, which corresponds to the key point 1715A, now closely fits to the key point 1705B, which corresponds to the key point 1705A. To clarify, the coordinates of the key point 1715B are closely aligned with the coordinates of the key point 1705A. The difference or offset between these coordinates is the fitting error 1730. In this example scenario, the fitting error 1730 satisfies the fitting threshold 1735, which corresponds to the fitting threshold 1530 of FIG. 15.

Because the fitting error 1730 satisfies the fitting threshold 1735, the embodiments have generated a pose for the 3D virtual object that, when reprojected into 2D space, causes the resulting 2D virtual object to "fit" to the original object. The process of generating, comparing, and potentially modifying the pose of the 3D virtual object (which results in modifications to the alignment of the key points) is referred to herein as "fitting" or simply as "fit." The embodiments are able to perform the generating, comparing, and modifying processes any number of times until the resulting fitting error satisfies the fitting threshold.

In some cases, the embodiments select whichever fitting error is the smallest 1740 as compared to the other computed fitting errors. For instance, because the processes described above may be repeated any number of times, some embodiments may elect to select the fitting error that has the smallest value as compared to the other fitting errors. In some cases, the embodiments select the fitting error that both satisfies the predetermined fitting threshold 1735 and that is the smallest 1740 while in other cases the embodiments select the fitting error that is the smallest 1740.

Calibration Using the Reprojection Parameters

Figure 18:
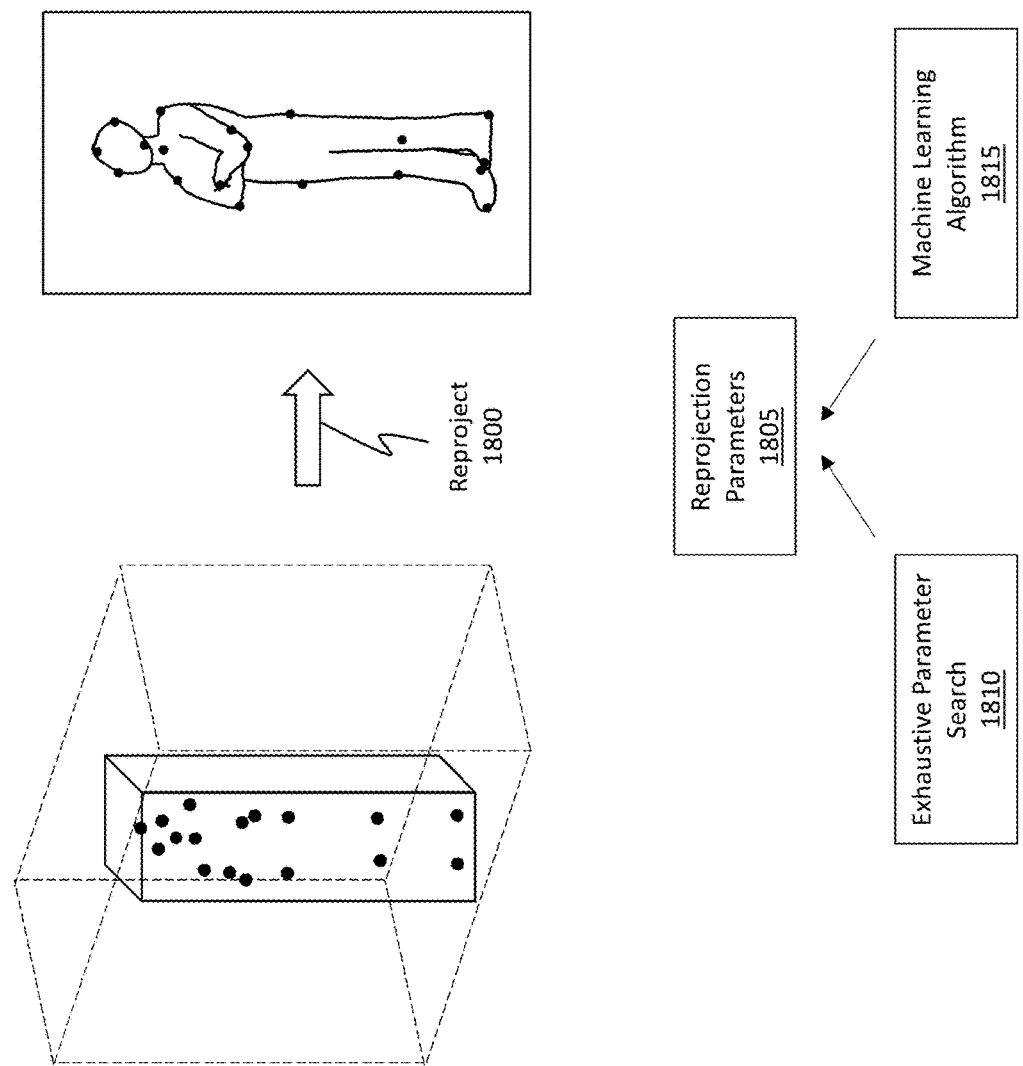
FIG. 18 illustrates how the embodiments are able to identify reprojection parameters used during the reprojection process. These parameters may be identified via an exhaustive parameter search or perhaps via use of a machine learning algorithm.

Attention will now be directed to FIG. 18, which provides additional clarification regarding the reproject 1800 operation discussed throughout this disclosure. By reprojecting a 3D virtual object into 2D space and by causing the resulting reprojected 2D virtual object to satisfactorily fit the actual object included in an image, the embodiments are effectively able to map out the location of the camera that generated the image having the original object. To clarify, the reprojection parameters 1805 that are used to perform the reproject 1800 operation reveal how the camera must be positioned in the environment and otherwise configured in order for the reprojected 2D virtual image to accurately fit the reprojected 2D virtual object to the actual object.

Figure 19:
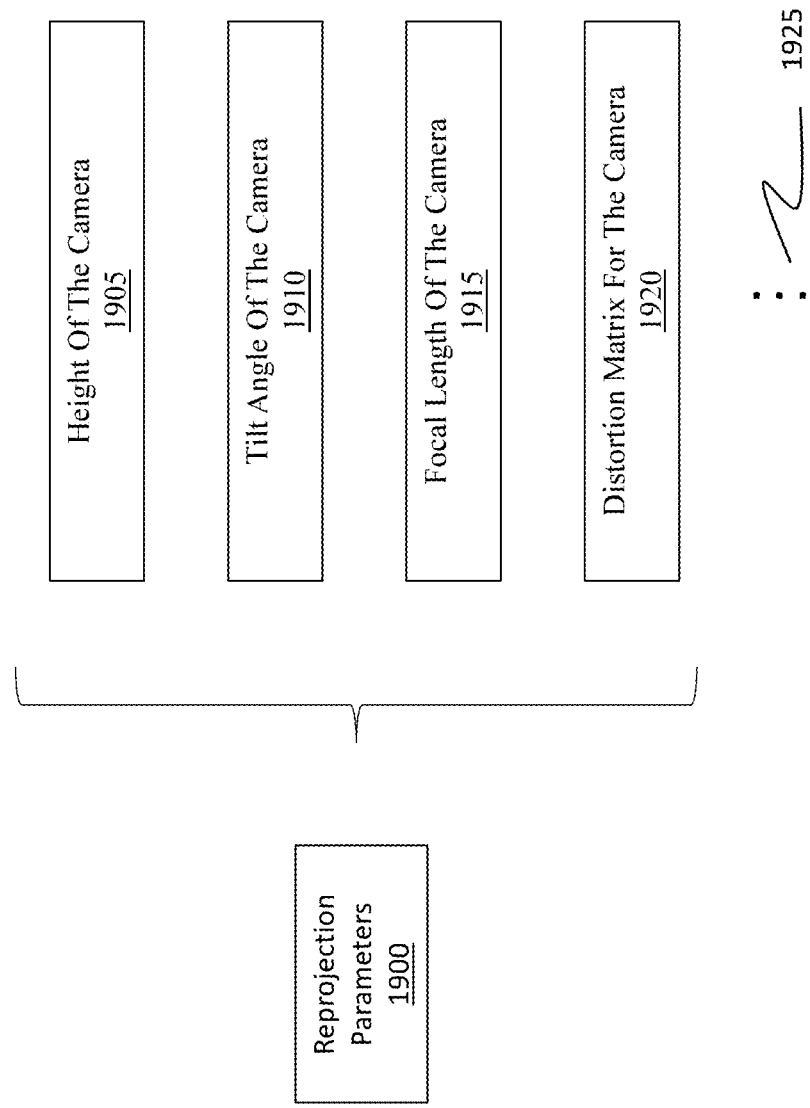
FIG. 19 illustrates specific types of reprojection parameters, which determine the calibration of the camera.

Turning briefly to FIG. 19, this figure shows reprojection parameters 1900, which are representative of the reprojection parameters 1805 from FIG. 18. These parameters include a height of the camera 1905, a tilt angle of the camera 1910, a focal length of the camera 1915, and a distortion matrix for the camera 1920. The height of the camera 1905 and the tilt angle of the camera 1910 can be considered extrinsic parameters in that they are based on physical positioning or a physical relationship of the camera relative to its environment. The focal length of the camera 1915 and the distortion matrix for the camera 1920 can be considered intrinsic parameters in that they are based on camera settings, features, or attributes of the camera itself (i.e. how the camera operates).

These four parameters, as well as potentially others as represented by the ellipsis 1925, are computed, derived, or determined as a result of performing the 3D to 2D reprojection. Furthermore, as will be discussed in more detail later, these reprojection parameters 1900 may be used to calibrate the camera in order to map 2D image content into 3D space via use of a single camera or single camera image.

Returning to FIG. 18, the reproject 1800 operation, or rather the generalized "fitting" operation described earlier (i.e. the generation, reprojection, comparison, and modification operations discussed earlier), may be performed in a number of different ways, such that the reprojection parameters 1805 may also be determined using a number of different techniques, including an exhaustive parameter search 1810 technique and a machine learning algorithm 1815 technique.

Regarding the exhaustive parameter search 1810 technique, generally the embodiments define some increasing state for each of the parameters, including a minimal value and a maximum value as well as a set of steps to transition from one estimate to the next (e.g., estimating the alignment of the estimated key points in an attempt to fit them to the original object's key points). With the exhaustive parameter search 1810, the embodiments attempt or try a selected number (or perhaps every number) of estimates for the reprojection parameters 1805 (including the modifications to the estimated key points) in an attempt to find which parameters and key points have a fitting error that satisfies the fitting threshold. For each iteration, the embodiments attach or log the resulting fitting error to that iterative run (i.e. to that step) and then choose the run resulting in the least fitting error.

In this regard, the exhaustive parameter search 1810 technique is an iterative method in which the embodiments incrementally adjust the estimated key points and the reprojection parameters 1805 until values are found that satisfy the fitting threshold. Accordingly, the "fitting" operations may be performed using the exhaustive parameter search 1810 technique.

The machine learning algorithm 1815 technique is somewhat similar to the exhaustive parameter search 1810 technique in that it also iteratively selects values in an attempt to reduce the fitting error. In contrast to the exhaustive parameter search 1810 technique, however, the machine learning algorithm 1815 technique relies on machine learning to select a next estimate for the estimated key points and reprojection parameters in an intelligent manner. Any type of machine learning may be used, as described earlier.

The machine learning algorithm 1815 may perform a gradient based back propagation operation to intelligently select the next values or estimates to use in the fitting process. Gradient based back propagation, or simple backpropagation, refers to a technique that determines the partial derivative of a cost function with respect to a weight in the neural network. The backpropagation technique generally indicates how quickly the cost is changed when the weights and biases are changed. In this regard, using gradient based back propagation, the embodiments are able to select estimate values that will attempt to minimize the fitting error by determining the gradient of the direction change of the estimated values.

Accordingly, the "fitting" operations disclosed herein may be performed via a number of different techniques, such as the exhaustive parameter search 1810 technique, the machine learning algorithm 1815 technique, or any other suitable technique. By reducing the fitting error and by generating a virtual object that "fits" to an actual object, the embodiments are able to determine a set of reprojection parameters 1805 that provide an indication of where the camera must be positioned relative to the surrounding environment as well as that camera's intrinsic operational characteristics. In effect, finding or determining the 2D virtual object that fits the original object enables the embodiments to determine the parameters of the camera, thereby effectively calibrating the camera so that the camera system understands its positional and operational relationship relative to the environment. Generally, the term "calibration" refers to the process of mapping the camera's coordinate system to a coordinate system of the real world. This calibration process is performed using the four parameters described in FIG. 19, further detail will be provided later. The reprojection process is able to reveal the values for these parameters. Accordingly, "fitting" the virtual object to the original object operates to calibrate the camera by obtaining data defining the values for those parameters to thereby map the camera's coordinate system to the real world.

To recap, in some implementations, the process of aligning the virtual object to identify the specific 3D alignment whose reprojection parameters satisfy the minimum fitting threshold (i.e. the "fitting" operation) is performed via an exhaustive parameter search. In some implementations, the process of aligning the virtual object to identify the specific 3D alignment whose reprojection parameters satisfy the minimum fitting threshold is performed via use of a machine learning algorithm.

Example Uses of a Calibrated Camera

Figure 20:
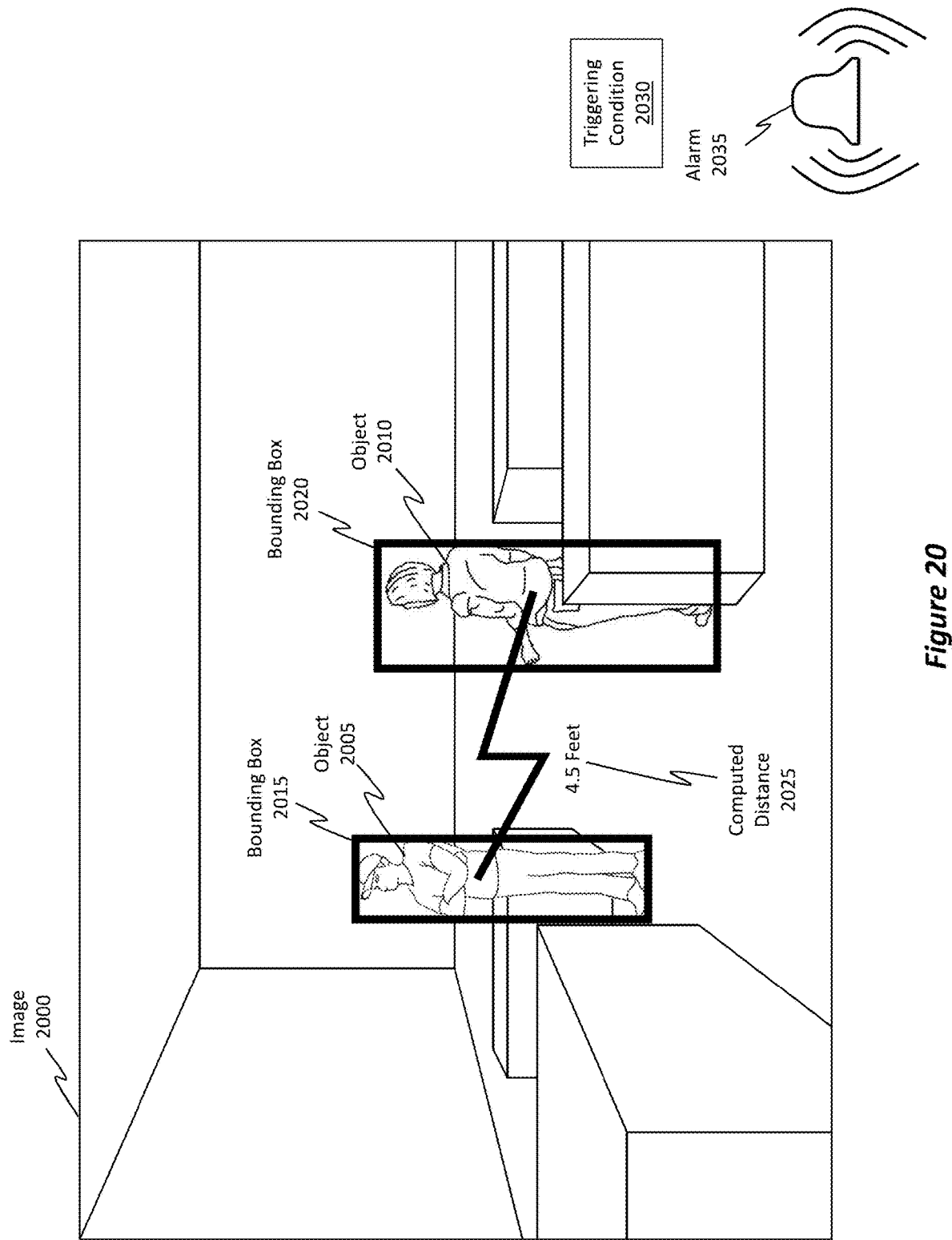
FIG. 20 illustrates how, once the camera is calibrated using the reprojection parameters, the 2D image can now be accurately mapped to 3D space, and distances between objects can be determined.

Attention will now be directed to FIG. 20, which illustrates an example image 2000, which is representative of the images discussed thus far. This image 2000 may be visually displayed in a monitoring system. Furthermore, this image 2000 is based on a camera that has undergone calibration using the fitting techniques described herein.

In this example, the image 2000 has been modified from its original form. Specifically, object 2005 and object 2010, which are representative of the objects discussed thus far, have been segmented in the manner described earlier. Furthermore, the image 2000 has been modified to now visually display a bounding box 2015 around object 2005 and a bounding box 2020 around the object 2010.

As a result of performing the fitting operations disclosed herein, the embodiments are able to determine depths or distances between objects even in a 2D image because the embodiments now have a working 3D mapping of the environment and the objects included in that environment. This 3D mapping can then be used to determine the distances between objects.

By way of additional clarification, the embodiments initially determined the details of an object included within the image 2000 (or a selected number of objects in order to provide a more robust calibration). Such an operation was performed using the average characteristics of the object to operate as a baseline for determining depth/distance. Once the characteristics of the object were determined, then the embodiments expanded that concept to deduce or derive distances for other objects and attributes of the environment.

For instance, in FIG. 20, once the characteristics of the human male and the human female were determined and properly mapped in 3D space using 3D virtual objects, the embodiments were then able to expand that understanding to other portions of the image 2000. That is, the embodiments can now determine a computed distance 2025 between the object 2005 and the object 2010. Although not illustrated, the embodiments can also determine the sizes, orientations, and placements of the other objects in the image 2000 (e.g., the walls, counters, ceilings, floor length, etc.). Distances between those objects can be computed as well. In this regard, the embodiments initially gain a 3D understanding of a known entity (e.g., based on average characteristics) and then use that initial understanding to gain a full understanding of the entire environment.

By way of an additional point of clarification, because the embodiments obtained details regarding the stature of the human male in image 2000, the embodiments can use that baseline understanding to the accurately estimate the attributes of the other objects. For instance, based on the known attributes of the human male's stature, the embodiments are able to accurately determine the size of the counter in front of the human male as well as the distance between the human male and that counter. Similarly, based on the known attributes of the human male's stature, the embodiments are able to determine the height and length of the walls as well as the distance between the human male and those walls. By calibrating the camera based on known attributes (which are known as a result of performing the disclosed fitting operations), the embodiments are able to build an understanding regarding the details of the objects included in an image 2000.

By performing these operations, numerous benefits and practical applications may be realized. For instance, the 3D mapping of the objects in the environment can now be used to determine whether a triggering condition 2030 is transpiring or occurring. If that triggering condition 2030 is occurring, then an alarm 2035 may be raised.

An example will be helpful. In the context of a pandemic, people are encouraged to maintain social distancing from one another. The disclosed embodiments are able to monitor a group of people to determine their distribution relative to one another and relative to the environment. The distances between these people may be determined in the manner described earlier. If it is identified that the distances are not meeting social distancing guidelines (i.e. a triggering condition 2030), then an alarm 2035 can be triggered. This alarm 2035 can be a public announcement over an intercom, a flashing alarm, or perhaps an alarm to a policing or security force to inform them of the violation.

As another example, the disclosed principles may be practiced in a traffic monitoring scenario to determine whether vehicles are overly congested, speeding, or a particular location may be accident prone. Alarms can be raised to potentially call in a police officer, firetruck, or ambulance. Indeed, the disclosed principles may be practiced in numerous different scenarios.

Accordingly, in some embodiments, an alarm is triggered in response to a triggering condition occurring. This triggering condition can be a condition in which the computed distance is less than a threshold distance between a first object and the second object (e.g., perhaps based on social distancing guidelines).

Modified Visualizations

Figure 21:
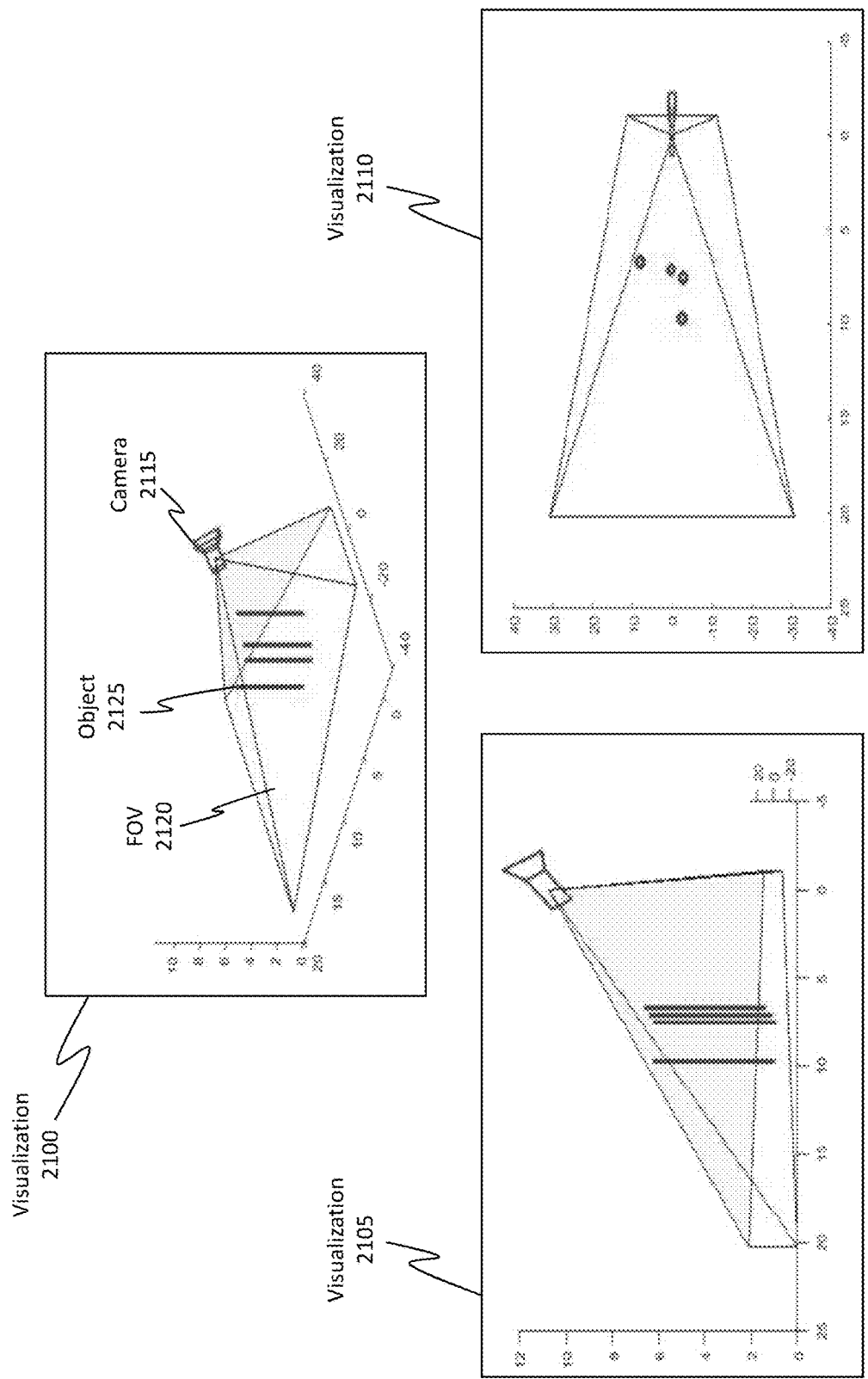
FIG. 21 illustrates how different visualizations of the camera relative to objects may be generated once the camera is calibrated.

Once the 3D mapping is generated by performing the fitting operations disclosed herein, any number of other visualizations may be generated as well. FIG. 21 illustrates some example visualizations, including visualization 2100, visualization 2105, and visualization 2110.

Visualization 2100 is shown as depicting a three-dimensional layout of an environment, where this layout may be derived or deduced using the disclosed fitting techniques. Specifically, visualization 2100 shows the positional relationship (in 3D) of a camera 2115 (which is representative of the cameras discussed herein) relative to its environment and other objects. Visualization 2100 also shows the FOV 2120 of camera 2115. Furthermore, visualization 2100 shows different objects, including object 2125, which are representative of the objects discussed herein. Based on this visualization 2100, which may be displayed to a user, the user can discern the positional relationship of the camera relative to the objects. The other visualizations (2105 and 2110) represent different viewpoints or perspectives of the same scene that is occurring in visualization 2100. Indeed, by practicing the disclosed principles, any number of visualizations may be generated and displayed showing any number of different perspectives of a scene.

In some embodiments, a zone can be drawn or generated, where the zone defines a particular region in the environment. In some cases, the zone can be drawn to inform an administrator whether people or objects are entering that zone or whether the number of people or objects in that zone exceeds a threshold number. By way of example, suppose a zone is generated for a region immediately in front of a grocery counter. The embodiments are able to monitor that zone and detect the number and distribution of objects entering that zone. If a threshold number is exceeded, then an alarm can be raised.

In accordance with the disclosed principles, the embodiments enable the zone to be drawn on the floor or ground as opposed to being drawn in the air. Because the embodiments utilize the flat earth camera model and because the camera is calibrated using this model, the embodiments are able to accurately determine where the ground plane is located. The zone can then be generated based on the understanding of where the ground plane is.

Once the zone has been generated based on the ground plane, the zone can be extended upward along the gravity vector, thereby generating a 3D volume defining the zone. Such a feature is beneficial because it may be the case that sometimes an object is not detected as touching the ground plane. For instance, in a retail scenario, a camera may be able to detect a person's head but not the person's feet (e.g., perhaps a clothing rack is blocking the person's feet). By extending the zone upward three-dimensionally, the embodiments are able to determine whether a portion of the person's body (e.g., perhaps the head) has entered or breached the zone.

Accordingly, a zone may be drawn on the ground plane. If desired, this zone can then be extended upward against the gravity vector to form a 3D zone. Of course, the height of this zone can be extended to any height. Example heights include, but are not limited to, 1 feet, 2 feet, 3, 4, 5, 6, 7, 8, 9, 10 feet or even all the way up to the ceiling.

Re-Calibration

The disclosed principles may be practiced when a camera is positioned at a fixed location and at a fixed orientation for at least a period of time. In some cases, the camera can be an oscillating camera that oscillates from one stop pose/position to another stop pose (e.g., the camera can stop at a particular position for a short period of time prior to oscillating to a new position). The calibration parameters, or rather the reprojection parameters, can be saved for each pose of the camera. Therefore, when the oscillating camera arrives at a particular saved position, the reprojection parameters can be recalled and used while the camera is at that pose. When the camera shifts to a new pose, other reprojection parameters may be recalled from memory and used while the camera is in that new pose. If the shutter of the camera is sufficiently fast, then the camera need not stop at a particular position in order to generate an image. Rather, the image can be once the camera arrives at a position without the camera stopping at that position.

Figure 22:
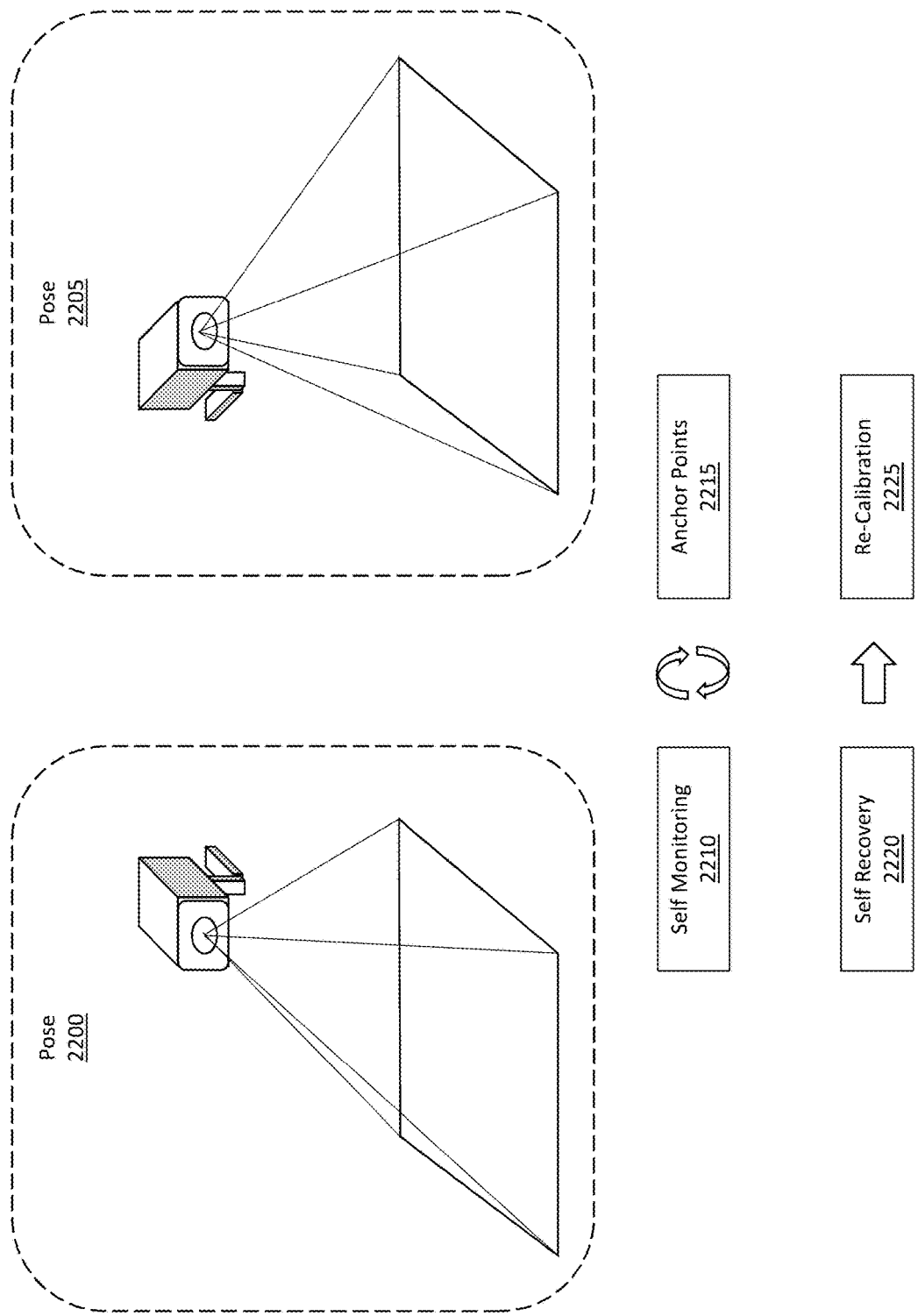
FIG. 22 illustrates how the camera system is able to perform self monitoring and self recovery.

Sometimes, however, the camera may be bumped, jarred, or repositioned such that the camera is positioned at a new position or at new poses. When this happens, its existing reprojection parameters are now invalid. FIG. 22 illustrates such a scenario. Specifically, FIG. 22 shows how a camera is positioned to have a particular pose 2200. As a result of bumping, jarring, repositioning, or perhaps even loss of power, the camera now has a new pose 2205 (or the reprojection parameters have been deleted for an existing pose). As a result of this new pose, 2205, it is advantageous to re-calibrate the camera. Such re-calibration can be performed automatically using the fitting operations described earlier. Furthermore, detecting when a new calibration should be performed can also be performed automatically without human involvement.

Specifically, the embodiments are able to perform self monitoring 2210 based on monitoring a set of anchor points 2215 in an environment. As described earlier, anchor points 2215 are reference points in an environment that are determined to be static in character (e.g., a door jam). When the camera generates a new image, the embodiments are able to compare this new image to previously generated images. If the anchor points in the previously generated images align or match with the anchor points detected in the current image, then the embodiments determine that the camera has not shifted. This comparison process may be performed for every new image or it may be performed periodically (e.g., based on a threshold time period elapsing between comparisons or based on a threshold number of new images being generated between comparisons).

In any event, the embodiments are able to compare past anchor points to current anchor points to determine whether the camera has unexpectedly shifted in pose. If the camera is in an expected pose, then the existing or previous calibration is still valid. On the other hand, if the camera is in an unexpected pose (e.g., as a result of bumping, jarring, or movement to a new location) based on the misalignment of anchor points (e.g., if successively identified anchor points are within a threshold distance of previously identified anchor points, then the existing calibration may still be used), then a self recovery 2220 operation is triggered in which a re-calibration 2225 is performed by conducting the operations disclosed herein.

Accordingly, the embodiments are able to self monitor to determine whether a new calibration operation is to be performed. This self monitoring may be performed based on the detection of anchor points or perhaps based on an identified change in GPS coordinates. If the camera is at a new pose, then the embodiments can self recover automatically by re-calibrating the camera relative to its environment.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 23A:
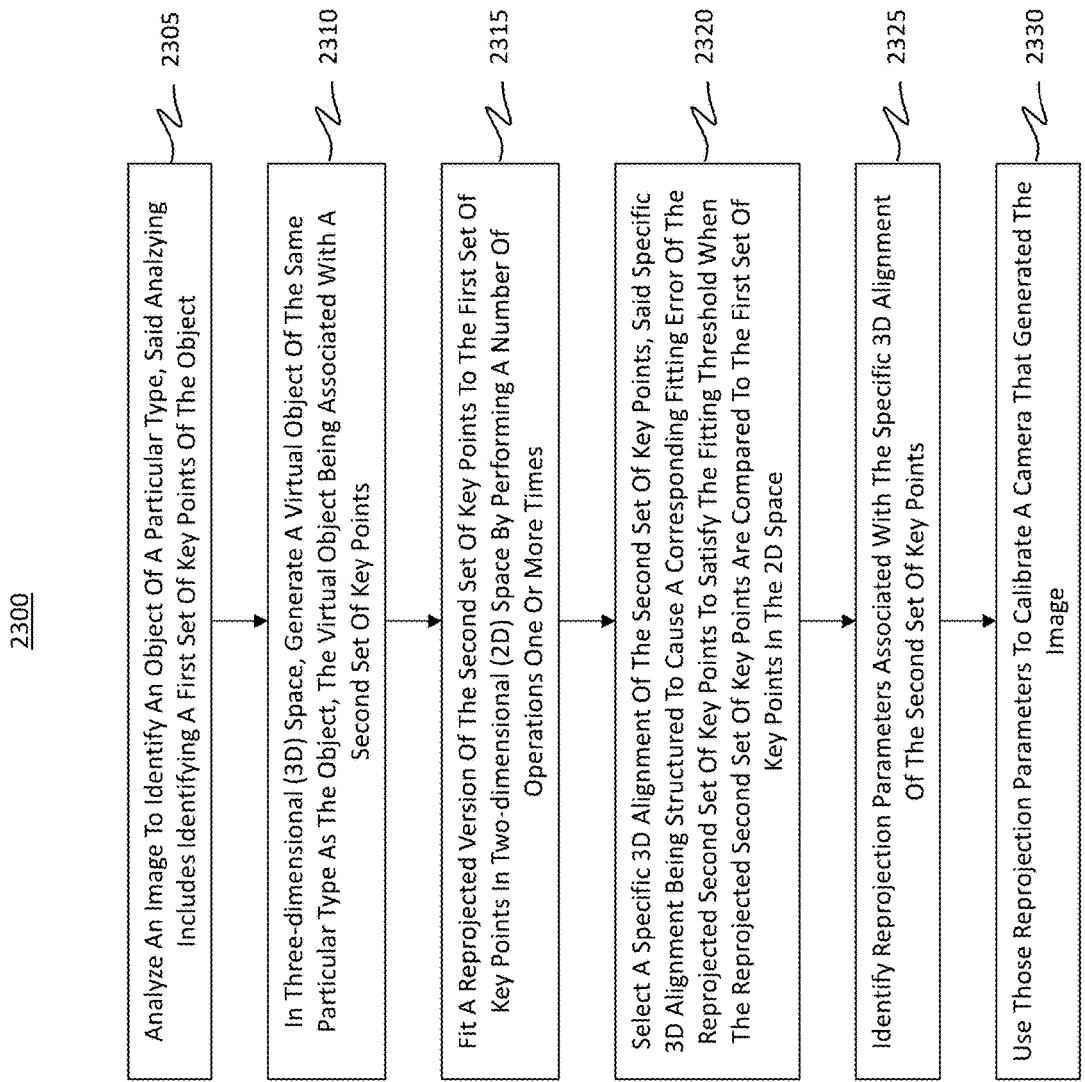
FIGS. 23A and 23B illustrate flowcharts of example methods for automatically calibrating a camera using a data driven approach.
Figure 23B:
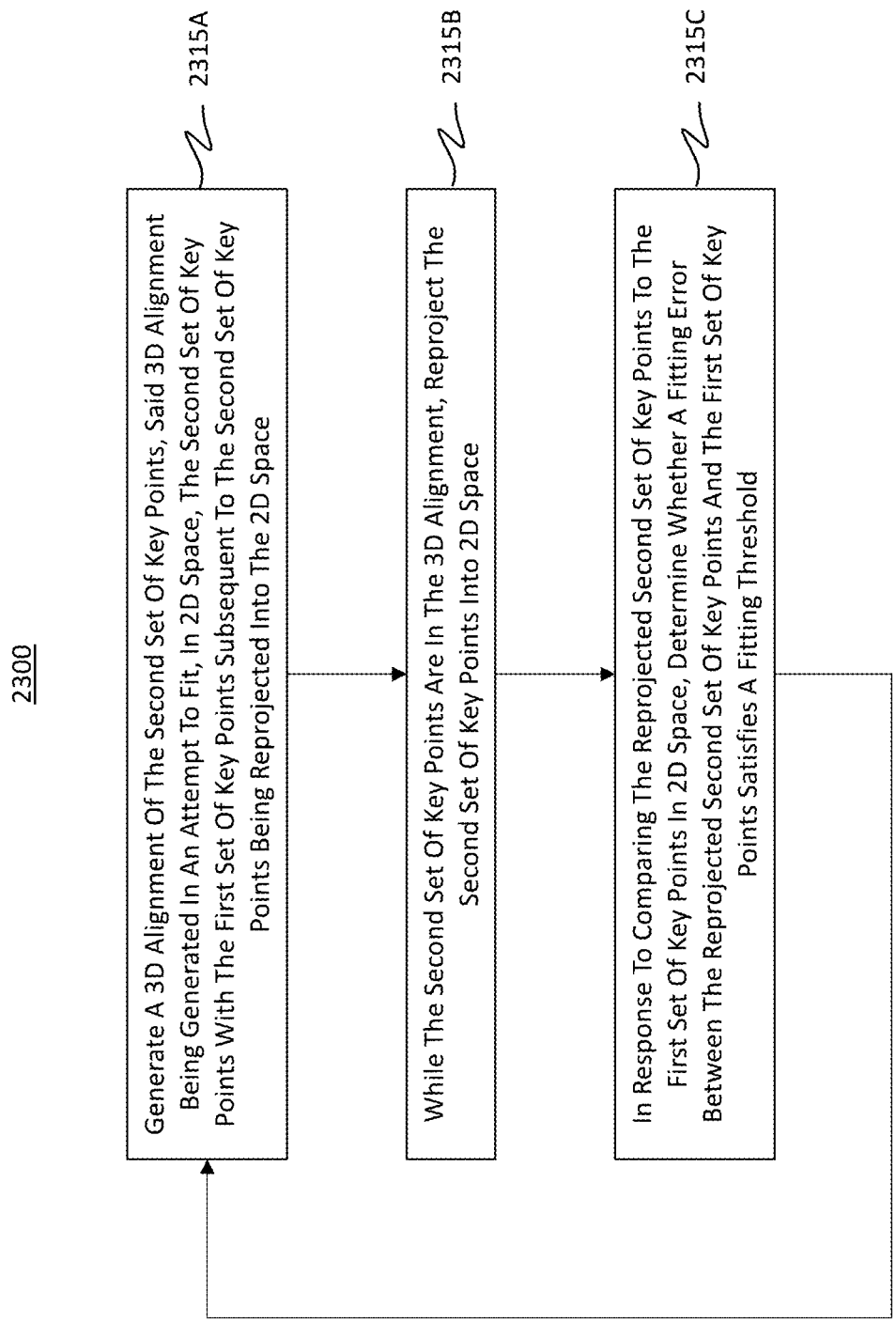

FIGS. 23A and 23B illustrate flowcharts of an example method 2300 for automatically calibrating a camera. In some embodiments, this calibration is performed relative to a flat earth camera model, as discussed previously. In some embodiments, the camera is a mounted camera positioned at a fixed location, and the method 2300 is triggered in response to a detected change of pose of the camera (e.g., perhaps based on anchor points).

Initially, method 2300 includes an act (act 2305) of analyzing, examining, reviewing, or segmenting an image (e.g., perhaps image 500 of FIG. 5) to identify an object (e.g., perhaps object 510) of a particular type (e.g., object type 520). This analyzing process may include identifying a first set of key points of the object, such as the first set of key points 735 illustrated in FIG. 7. In some cases, the embodiments search the image to identify a particular type of object. For example, the embodiments may search the image to identify humans, vehicles, signs, or other objects. The specifically searched-for objects are searched for as a result of the embodiments determining that those objects are associated with a known set of average characteristics.

In some cases, the average characteristics can be dynamically determined. For instance, humans in Asia are on average shorter that humans in the United States. Consequently, the embodiments are able to adjust or even dynamically determine the average characteristics based on specific attributes in a particular locale. Of course, other attributes or characteristics may be used as well. In some cases, the average characteristics can be adjusted over time.

In some cases, the particular type of the object is a human or a vehicle. Furthermore, the method may include an act of determining a so-called "sub-type" of the human or the vehicle. For instance, the sub-type of the human includes one or more of a gender of the human, a locality of the human, a race of the human, or perhaps a human adult or child. The sub-type of the vehicle may include a manufacturer, model, a car, truck, van, SUV, sedan, coupe, or year of the vehicle. The second set of key points are then generated based on average characteristics that are determined for the sub-type of the human or the vehicle.

By way of example, the average characteristics for the sub-type of the human are one or more of an average height, an average neck length, or an average shoulder width based on the gender of the human as detected in the image or the locality of the human as determined by a location associated with the image (e.g., perhaps determined by GPS coordinates or recognizable geographic features captured in the image) or the race of the human as detected in the image. The average characteristics for the sub-type of the vehicle can include a length, width, weight, and so forth of a particular model of vehicle.

Method 2300 includes an act (act 2310) of generating, in three-dimensional (3D) space, a virtual object (e.g., 3D virtual object 910 from FIG. 9) of the same particular type as the object. Notably, the virtual object is associated with its own set of key points (e.g., the second set of key points 1020 in FIG. 10).

Method 2300 then includes an act (act 2315) of fitting a reprojected version of the second set of key points to the first set of key points in two-dimensional (2D) space. In some embodiments, this fitting may be modeled using a flat earth camera model. Furthermore, this fitting is performed by repeatedly performing a number of operations one or more times, such as (but not necessarily) until a subsequently computed fitting error satisfies a fitting threshold (as discussed earlier) or, additionally or alternatively, until a smallest fitting error is identified. The operations are listed in FIG. 23B.

For instance, FIG. 23B shows an act (act 2315A) of generating a 3D alignment of the second set of key points, as shown by the 3D alignment 1100 of FIG. 11. This 3D alignment is generated in an attempt to fit, in the 2D space (e.g., potentially modeled using the flat earth camera model), the second set of key points with the first set of key points (e.g., after or subsequent to the second set of key points being reprojected into the 2D space). In this regard, the 3D alignment is an estimated alignment that is designed in an effort to have a minimal fitting error, as described earlier.

While the second set of key points are in the 3D alignment, method 2300 includes an act (act 2315B) of reprojecting the second set of key points into the 2D space. FIG. 12 shows how the 3D alignment 1205 is reprojected (e.g., reproject 1215) into 2D space to form the reprojected second set of key points 1225 and the 2D visualization.

In response to comparing the reprojected second set of key points to the first set of key points in the 2D space (e.g., the comparison process was illustrated in both FIGS. 15 and 17), method 2300 includes an act (act 2315C) of determining whether a fitting error (e.g., fitting error 1525 in FIG. 15) between the reprojected second set of key points and the first set of key points satisfies the fitting threshold (e.g., fitting threshold 1530). If the fitting threshold is satisfied, then the embodiments perform act 2320 in FIG. 23A. On the other hand, if the fitting threshold is not satisfied, then the acts 2315A, 2315B, and 2315C are repeated until the fitting error does satisfy the fitting threshold, as shown by the line extending from act 2315C back to act 2315A. These iterative or repetitive operations were illustrated by the repeat 1245 operation shown in FIG. 12. Additionally, or alternatively, the embodiments perform the operations one or more times (e.g., 2, 3, 4, 5, 6, 7, 8, 9, 10, 20, 30, etc.). After repeating the operations the selected number of times, the embodiments then identify the fitting error that is the smallest as compared to the other fitting errors that were computed in each iteration.

Returning to FIG. 23A, method 2300 includes an act (act 2320) of selecting a specific 3D alignment of the second set of key points. Because the processes outlined in FIG. 23B may be performed multiple times, the selection process recited in act 2320 includes searching from among these multiple generated camera parameters (i.e. the alignment data) in an effort to select the set of parameters that have the least or smallest resulting fitting error (e.g., the smallest 1740 in FIG. 17) and/or that satisfy the threshold requirement. In some embodiments, the selected parameter is required to be both the smallest fitting error (as compared to the other computed fitting errors) and to satisfy the threshold requirement. In some embodiments, the selected parameter may simply be the one with the smallest fitting error as compared to the other fitting errors without necessarily satisfying the threshold requirement. In this regard, the embodiments search the camera parameters space (both internal and external) for the parameters having the least fitting error by performing the exhaustive parameter search or by using machine learning.

Notably, the above selected specific 3D alignment is selected because it is structured to cause the reprojected second set of key points, or rather the computed fitting error corresponding to the comparison between the reprojected second set of key points and the first set of key points, to satisfy the fitting threshold when the reprojected second set of key points are compared to the first set of key points in the 2D space. Additionally, or alternatively, the selected set is the one that has the smallest or least fitting error (e.g., smallest 1740 in FIG. 17). The method acts 2305 through 2320 generally constitute a "fitting" procedure used to accurately map an image into 3D space. Furthermore, FIG. 17 is representative of act 2320 in that the modified virtual object 1710 now accurately fits the object 1700, or rather, the two sets of key points align with one another such that the fitting errors satisfy the fitting threshold. The modified virtual object 1710, or rather the modified reprojected key point(s) 1720 of FIG. 17 correspond to the reprojected second set of key points described in act 2320. Similarly, the specific 3D alignment 1610 of FIG. 16 (which forms the basis for the modified reprojected key point(s) 1720 of FIG. 17) correspond to the specific 3D alignment mentioned in act 2320.

Once the two sets of key points fit one another (as determined by the comparison of the fitting errors against the fitting threshold), method 2300 includes an act (act 2325) of identifying reprojection parameters associated with the specific 3D alignment of the second set of key points. These parameters are the ones whose fitting error satisfies the threshold and/or whose fitting error is the smallest as compared to all the other computed fitting errors. Then, in act 2330, there is an operation of using those reprojection parameters to calibrate the camera that generated the image. Specifically, the reprojection parameters are used to calibrate one or more of the following for the camera: (i) a height of the camera, (ii) a tilt angle of the camera, (iii) a focal length of the camera, or (iv) a distortion for the camera. By performing the disclosed operations, the embodiments are able to calibrate a camera without prior information regarding a focal length of the camera, a distortion matrix of the camera, a tilt angle of the camera, or even a height of the camera.

As used herein, the term "calibrate" generally refers to using the determined parameters to determine a transformation matrix of the camera, which matrix is used in order to transform image coordinates into real-world coordinates, or vice-versa. That is, because dimensions of features are now known, the embodiments calibrate the camera by relating coordinates identified within an image frame to spatial or physical positions of the environment, as captured by the image. In this regard, the process of calibrating a camera includes relating the camera's coordinate system to a real-world coordinate system using the transformation matrix, which is influenced or calibrated via the parameters discussed earlier.

Although not illustrated, method 2300 may include additional acts. For instance, subsequent to calibrating the camera, method 2300 may include an act of overlaying a visualization of the bounding box around the object in the image, as was shown in FIG. 20. Additionally, method 2300 may include an act of overlaying an indication of a computed distance between the object and a second object in the image, as was also shown in FIG. 20. This computed distance can be determined based on the calibration of the camera. Method 2300 may also include an act of displaying the image with the overlaid visualization of the bounding box and the overlaid indication of the computed distance for a user to view.

Accordingly, the embodiments disclosed herein provide substantial benefits to the technical field. These benefits include, but certainly are not limited to, the ability to automatically calibrate a single camera using detected features within the camera's FOV or scene. Additionally, the embodiments are able to automatically perform self monitoring to determine when a new calibration event is to be triggered. Furthermore, the embodiments are beneficially able to calibrate a camera without prior information regarding the camera's characteristics.

Example Computer/Computer Systems

Attention will now be directed to FIG. 24 which illustrates an example computer system 2400 that may include and/or be used to perform any of the operations described herein. Computer system 2400 may take various different forms. For example, computer system 2400 may be embodied as a tablet, a desktop, a laptop, a mobile device, a camera system, or a standalone device. Computer system 2400 may also be a distributed system that includes one or more connected computing components/devices that are in communication with computer system 2400.

In its most basic configuration, computer system 2400 includes various different components. FIG. 24 shows that computer system 2400 includes one or more processor(s) 2405 (aka a "hardware processing unit"), input/output I/O 2410, camera sensor(s) 2415, a ML engine 2420, and storage 2425.

Regarding the processor(s) 2405, it will be appreciated that the functionality described herein can be performed, at least in part, by one or more hardware logic components (e.g., the processor(s) 2405). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

The I/O 2410 can include any type of input or output device, without limit. Examples include a keyboard, a mouse, a touchscreen, a stylus, and so forth. Camera sensor(s) 2415 can include any type of camera, including the cameras discussed in this disclosure (e.g., those illustrated in FIG. 2).

The ML engine 2420 may be implemented as a specific processing unit (e.g., a dedicated processing unit as described earlier) configured to perform one or more specialized operations for the computer system 2400. The ML engine 2420 may include the ML algorithm 610 of FIG. 6, the ML algorithm 705 of FIG. 7, or even the machine learning algorithm 1815 of FIG. 18.

As used herein, the terms "executable module," "executable component," "component," "module," or "engine" can refer to hardware processing units or to software objects, routines, or methods that may be executed on computer system 2400. The different components, modules, engines, and services described herein may be implemented as objects or processors that execute on computer system 2400 (e.g. as separate threads). The ML engine 2420 (or perhaps even just the processor(s) 2405) can be configured to perform any of the disclosed method acts or other functionalities.

Storage 2425 may be physical system memory, which may be volatile, non-volatile, or some combination of the two. The term "memory" may also be used herein to refer to non-volatile mass storage such as physical storage media. If computer system 2400 is distributed, the processing, memory, and/or storage capability may be distributed as well.

Storage 2425 is shown as including executable instructions (i.e. code 2430). The executable instructions represent instructions that are executable by the processor(s) 2405 (or perhaps even the ML engine 2420) of computer system 2400 to perform the disclosed operations, such as those described in the various methods.

The disclosed embodiments may comprise or utilize a special-purpose or general-purpose computer including computer hardware, such as, for example, one or more processors (such as processor(s) 2405) and system memory (such as storage 2425), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 2400 may also be connected (via a wired or wireless connection) to external sensors (e.g., one or more remote cameras) or devices via a network 2435. For example, computer system 2400 can communicate with any number devices or cloud services to obtain or process data. In some cases, network 2435 may itself be a cloud network. Furthermore, computer system 2400 may also be connected through one or more wired or wireless networks 2435 to remote/separate computer systems(s) that are configured to perform any of the processing described with regard to computer system 2400.

A "network," like network 2435, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 2400 will include one or more communication channels that are used to communicate with the network 2435. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system configured to automatically calibrate a camera, said computer system comprising:
   one or more processors; and
   one or more computer-readable hardware storage devices that store instructions that are executable by the one or more processors to cause the computer system to at least:
      analyze an image to identify an object of a particular type, said analyzing includes identifying a first set of key points of the object;
      generate a virtual object of the same particular type as the object, the virtual object being associated with a second set of key points;
      fit a reprojected version of the second set of key points to the first set of key points in two-dimensional (2D) space by repeatedly performing the following operations one or more times:
         generate a 3D alignment of the second set of key points, said 3D alignment being generated in an attempt to fit, in 2D space, the second set of key points with the first set of key points subsequent to the second set of key points being reprojected into the 2D space;
         while the second set of key points are in the 3D alignment, reproject the second set of key points into the 2D space;
         in response to comparing the reprojected second set of key points to the first set of key points in the 2D space, determine a fitting error between the reprojected second set of key points and the first set of key points;
      select a specific 3D alignment of the second set of key points, said specific 3D alignment being associated with a corresponding fitting error of the reprojected second set of key points having a smallest fitting error when compared to other computed fitting errors;
      identify reprojection parameters associated with the specific 3D alignment of the second set of key points; and
      use the reprojection parameters to calibrate a camera that generated the image.

2. The computer system of claim 1, wherein the object is a human, and wherein the first set of key points includes a head key point corresponding to a head of the human and a foot key point corresponding to a foot of the human.

3. The computer system of claim 1, wherein the fitting error is based on a detected offset between coordinates of the reprojected second set of key points relative to coordinates of the first set of key points.

4. The computer system of claim 1, wherein calibrating the camera includes relating a coordinate system of the camera to a real-world camera system using a transformation matrix that is determined by the reprojection parameters.

5. The computer system of claim 1, wherein a machine learning algorithm segments the image during said analyzing by generating a bounding box around the object and by identifying the first set of key points.

6. The computer system of claim 1, wherein calibrating the camera is performed without prior information regarding a focal length of the camera.

7. The computer system of claim 1, wherein calibrating the camera is performed without prior information regarding a distortion matrix of the camera.

8. The computer system of claim 1, wherein execution of the computer-executable instructions further causes the computer system to:
   use the reprojection parameters to calibrate one or more of the following for the camera: (i) a height of the camera, (ii) a tilt angle of the camera, (iii) a focal length of the camera, or (iv) a distortion for the camera.

9. The computer system of claim 1, wherein the corresponding fitting error is also required to satisfy a fitting threshold.

10. The computer system of claim 1, wherein calibrating the camera includes relating a coordinate system of the camera to a real-world camera system using a transformation matrix that is determined by the reprojection parameters, said calibration including calibrating: (i) a height of the camera, (ii) a tilt angle of the camera, (iii) a focal length of the camera, or (iv) a distortion for the camera.

11. The computer system of claim 1, wherein analyzing the image to identify the object of the particular type includes:
   generating a bounding box encompassing pixels corresponding to the object; and
   subsequently identifying the first set of key points of the object based on the bounding box.

12. The computer system of claim 1, wherein the second set of key points are based on average characteristics that are determined for objects of that particular type.

13. The computer system of claim 1, wherein the particular type of the object is a human or a vehicle, wherein a sub-type of the human or the vehicle is determined, and wherein the second set of key points are based on average characteristics that are determined for the sub-type of the human or the vehicle.

14. The computer system of claim 13, wherein:
the particular type is the human,
the sub-type of the human includes one or more of a gender of the human, a locality of the human, or a race of the human, and
the average characteristics for the sub-type of the human are one or more of an average height, an average neck length, an average shoulder width based on the gender of the human as detected in the image or the locality of the human as determined by a location associated with the image or the race of the human as detected in the image.

15. A method for automatically calibrating a camera, said method comprising:
analyzing an image to identify an object of a particular type, said analyzing includes identifying a first set of key points of the object;
generating a virtual object of the same particular type as the object, the virtual object being associated with a second set of key points;
fitting a reprojected version of the second set of key points to the first set of key points in two-dimensional (2D) space by repeatedly performing the following operations until a subsequently computed fitting error satisfies a predetermined fitting threshold:
generating a 3D alignment of the second set of key points, said 3D alignment being generated in an attempt to fit, in 2D space, the second set of key points with the first set of key points subsequent to the second set of key points being reprojected into the 2D space;
while the second set of key points are in the 3D alignment, reprojecting the second set of key points into 2D space;
in response to comparing the reprojected second set of key points to the first set of key points in 2D space, determining whether a fitting error that is computed between the reprojected second set of key points and the first set of key points satisfies the predetermined fitting threshold;
selecting a specific 3D alignment of the second set of key points, said specific 3D alignment being structured to cause a corresponding fitting error of the reprojected second set of key points to satisfy the fitting threshold when the reprojected second set of key points are compared to the first set of key points in the 2D space;
identifying reprojection parameters associated with the specific 3D alignment of the second set of key points; and
using the reprojection parameters to calibrate a camera that generated the image.

16. The method of claim 15, wherein the method further includes:
subsequent to calibrating the camera, overlaying a visualization of a bounding box around the object in the image;
overlaying an indication of a computed distance between the object and a second object in the image, the computed distance being determined based on said calibration of the camera; and
displaying the image with the overlaid visualization of the bounding box and the overlaid indication of the computed distance.

17. The method of claim 16, wherein an alarm is triggered in response to a triggering condition being detected, said triggering condition being a condition in which the computed distance is less than a threshold distance between the object and the second object.

18. The method of claim 15, wherein the camera is a mounted camera positioned at a fixed location, and wherein the method is triggered in response to a detected change of pose of the camera.

19. The method of claim 15, wherein the camera is pan, tilt, zoom (PTZ) camera, and wherein the PTZ camera is one of a red, green, blue (RGB) camera, a low light camera, a thermal imaging camera, or an ultraviolet (UV) camera.

20. A computer system configured to automatically calibrate a camera relative to a flat earth camera model, said computer system comprising:
one or more processors; and
one or more computer-readable hardware storage devices that store instructions that are executable by the one or more processors to cause the computer system to at least:
analyze an image to identify an object of a particular type, said analyzing includes identifying a first set of key points of the object;
generate a virtual object of the same particular type as the object, the virtual object being associated with a second set of key points;
fit a reprojected version of the second set of key points to the first set of key points in two-dimensional (2D) space that is modeled using a flat earth camera model, said fitting being performed by repeatedly performing the following operations until a subsequently computed fitting error satisfies a predetermined fitting threshold:
generate a 3D alignment of the second set of key points, said 3D alignment being generated in an attempt to fit, in the 2D space modeled using the flat earth camera model, the second set of key points with the first set of key points subsequent to the second set of key points being reprojected into the 2D space;
while the second set of key points are in the 3D alignment, reproject the second set of key points into the 2D space;
in response to comparing the reprojected second set of key points to the first set of key points in the 2D space, determine whether a fitting error that is computed between the reprojected second set of key points and the first set of key points satisfies the predetermined fitting threshold;
select a specific 3D alignment of the second set of key points, said specific 3D alignment being structured to cause a corresponding fitting error of the reprojected second set of key points to satisfy the fitting threshold when the reprojected second set of key points are compared to the first set of key points in the 2D space;
identify reprojection parameters associated with the specific 3D alignment of the second set of key points; and
use those reprojection parameters to calibrate a camera that generated the image.

* * * * *